United States Patent
Kwon et al.

(10) Patent No.: US 9,655,071 B2
(45) Date of Patent: *May 16, 2017

(54) APPARATUS AND METHOD FOR PERFORMING UPLINK SYNCHRONIZATION IN WIRELESS COMMUNICATION SYSTEM

(71) Applicant: Pantech Inc., Seoul (KR)

(72) Inventors: Ki Bum Kwon, Seoul (KR); Myung Cheul Jung, Seoul (KR); Jae Hyun Ahn, Seoul (KR)

(73) Assignee: GOLDPEAK INNOVATIONS INC, Guro-Gu, Seoul (KR)

( * ) Notice: Subject to any disclaimer, the term of this patent is extended or adjusted under 35 U.S.C. 154(b) by 416 days.

This patent is subject to a terminal disclaimer.

(21) Appl. No.: 14/493,673

(22) Filed: Sep. 23, 2014

(65) Prior Publication Data

US 2015/0009985 A1 Jan. 8, 2015

(30) Foreign Application Priority Data

May 27, 2011 (KR) ........................ 10-2011-0050811
Jun. 1, 2011 (KR) ........................ 10-2011-0052957

(Continued)

(51) Int. Cl.
*H04W 56/00* (2009.01)
*H04W 74/08* (2009.01)
(Continued)

(52) U.S. Cl.
CPC ..... *H04W 56/001* (2013.01); *H04W 56/0005* (2013.01); *H04W 56/0045* (2013.01);
(Continued)

(58) Field of Classification Search
CPC ............. H04W 56/001; H04W 74/006; H04W 74/0833; H04W 56/0005; H04W 56/0045;
(Continued)

(56) References Cited

U.S. PATENT DOCUMENTS 8,897,156 B2 11/2014 Wang et al.
2009/0232107 A1 9/2009 Park et al.
(Continued)

FOREIGN PATENT DOCUMENTS

CN 101841391 9/2010
CN 101946425 1/2011
(Continued)

OTHER PUBLICATIONS

Qualcomm Incorporated, "Consideration on multiple TA", 3GPP TSG-RAN WG2 Meeting #74, R2-113063, May 9-13, 2011, Barcelona, Spain.

(Continued)

*Primary Examiner* — Kwang B Yao
*Assistant Examiner* — Syed M Bokhari

(57) ABSTRACT

This specification relates to an apparatus and method for performing random access in a wireless communication system. This specification discloses a mobile station, including a reception unit for receiving TAG configuration information on which at least one serving cell configured in the mobile station is classified as a Timing Alignment Group (TAG) from a base station and a transmission unit for transmitting a random access preamble to the base station on one representative serving cell within the TAG. In accordance with this specification, a procedure of obtaining a TAV for a serving cell in order to secure and maintain uplink timing synchronization becomes clear, the time taken to obtain uplink synchronization for a serving cell may be reduced, and overhead due to excessive random access (Continued)

attempts may be reduced by obtaining a TAV for a plurality of serving cells through one random access procedure.

8 Claims, 26 Drawing Sheets

(30) Foreign Application Priority Data

| Oct. 28, 2011 | (KR) | ........................ | 10-2011-0111531 |
|---|---|---|---|
| Nov. 9, 2011 | (KR) | ........................ | 10-2011-0116671 |
| Feb. 28, 2012 | (KR) | ........................ | 10-2012-0020621 |

(51) Int. Cl.
  *H04W 74/00* (2009.01)
  *H04W 28/06* (2009.01)
  *H04W 72/12* (2009.01)
  *H04W 88/02* (2009.01)
(52) U.S. Cl.
  CPC ..... *H04W 74/006* (2013.01); *H04W 74/0833* (2013.01); *H04W 28/06* (2013.01); *H04W 72/1289* (2013.01); *H04W 88/02* (2013.01)
(58) Field of Classification Search
  CPC .. H04W 28/06; H04W 88/02; H04W 72/1289
  USPC .................................................. 370/350, 328
  See application file for complete search history.

(56) References Cited

U.S. PATENT DOCUMENTS

| 2010/0232363 | A1 | 9/2010 | Hsu |
| 2011/0045863 | A1 | 2/2011 | Lee et al. |
| 2011/0179335 | A1 | 7/2011 | Hong et al. |
| 2011/0200032 | A1 | 8/2011 | Lindström et al. |
| 2012/0257569 | A1* | 10/2012 | Jang ........................ H04L 5/001 370/328 |
| 2012/0257601 | A1 | 10/2012 | Kim et al. |
| 2012/0287865 | A1 | 11/2012 | Wu et al. |

FOREIGN PATENT DOCUMENTS

| EP | 2230787 | 9/2010 |
| JP | 2013-520050 | 5/2013 |
| JP | 2014-514840 | 6/2014 |
| KR | 10-2009-0098421 | 9/2009 |
| KR | 10-2009-0116604 | 11/2009 |
| KR | 10-2010-0032299 | 3/2010 |
| WO | 2010-130196 | 11/2010 |
| WO | 2013125890 | 8/2013 |

OTHER PUBLICATIONS

Catt, "Consideration on TA Group", 3GPP TSG-RAN WG2 Meeting #74, R2-112814, May 9-13, 2011, Barcelona, Spain.
3GPP, "Evolved Universal Terrestrial Radio Access (E-UTRA);Medium Access Control (MAC) protocol specification (Release 10)", 3GPP TS 36.321 V10.1.0, Mar. 2011.
International Search Report dated Nov. 12, 2012 in International Application No. PCT.KR2012/004184.
Non-Final Office Action issued on Dec. 6, 2013 in U.S. Appl. No. 13/481,481.
Notice of Allowance issued on May 23, 2014 in U.S. Appl. No. 13/481,481.
LG Electronics Inc., "TAC MAC CE and Multiple Timing Advances", 3GPP TSG-RAN2 Meeting #77, Feb. 6-10, 2012, pp. 1-2, R2-120707, Dresden, Germany.
Ericsson et al., "Timing Advance Maintenance for SCells", 3GPP TSG-RAN WG2 #77bis, Mar. 26-30, 2012, Jeju, South Korea, Tdoc R2-121558.
EP Search Report dated Oct. 31, 2014, in EP Application No. 12794101.1.

* cited by examiner

FIG. 9
[ Embodiment 1 ]
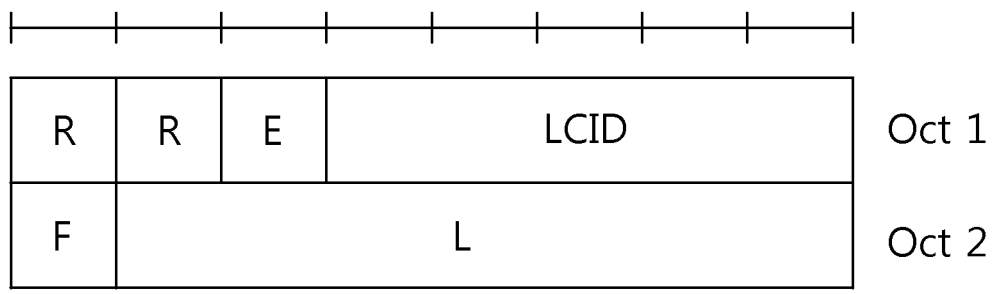
R/R/E/LCID/F/L sub-header with
7-bit L field
[ Embodiment 2 ]
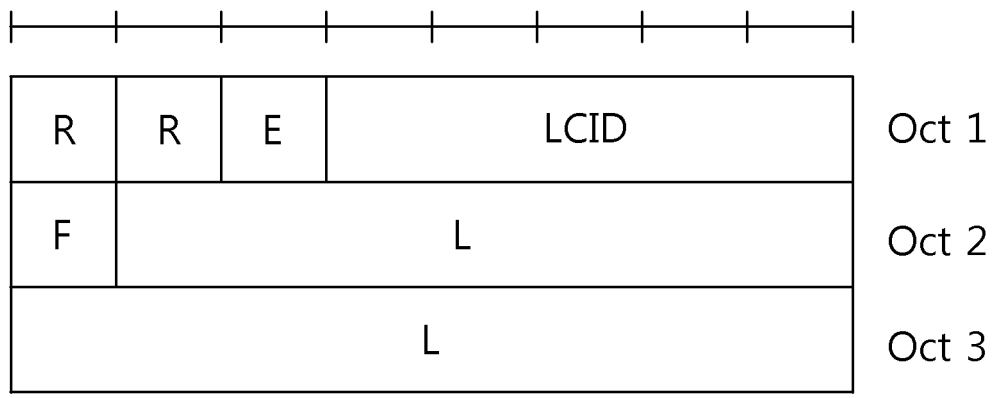
R/R/E/LCID/F/L sub-header with
15-bit L field

APPARATUS AND METHOD FOR PERFORMING UPLINK SYNCHRONIZATION IN WIRELESS COMMUNICATION SYSTEM

CROSS-REFERENCE TO RELATED APPLICATIONS

The present application is a continuation of U.S. patent application Ser. No. 13/481,481, filed on May 25, 2012, and claims priority from and the benefit of Korean Patent Application Nos. 10-2011-0050811 filed on May 27, 2011, 10-2011-0052957 filed on Jun. 1, 2011, 10-2011-0111531 filed on Oct. 28, 2011, 10-2011-0116671 filed on Nov. 9, 2011 and 10-2012-0020621 filed on Feb. 28, 2012, which are all incorporated herein by reference for all purposes as if fully set forth herein.

BACKGROUND

Field of the Invention

The present invention relates to wireless communication and, more particularly, to an apparatus and method for performing uplink synchronization in a wireless communication system.

Discussion of the Background

In a common wireless communication system, although an uplink bandwidth and a downlink bandwidth are different, only one carrier is chiefly taken into consideration. Even in 3rd Generation Partnership Project (3GPP) Long Term Evolution (LTE), the number of carriers forming uplink and downlink is 1, and an uplink bandwidth and a downlink bandwidth are commonly symmetrical to each other on the basis of a single carrier. A multiple carrier system is recently introduced.

A multiple carrier system means a wireless communication system capable of supporting a carrier aggregation (CA). The carrier aggregation is technology for efficiently using fragmented and small bands, and it has an effect that a logically large band is used by binding a plurality of bands which are physically non-contiguous to each other in the frequency region.

In order for a mobile station to access a network, the mobile station must perform a random access procedure. The random access procedure may be divided into a contention-based random access procedure and a non-contention-based random access procedure. The greatest difference between the contention-based random access procedure and the non-contention-based random access procedure lies in whether a random access preamble is dedicated and designated to one mobile station. In the non-contention-based random access procedure, contention (or a collision) between mobile stations does not occur because a mobile station uses a random access preamble dedicated thereto itself. Here, the term 'contention' means that two or more mobile stations attempt a random access procedure using the same random access preamble through the same resources. In the contention-based random access procedure, there is a possibility of contention because a mobile station uses a randomly selected random access preamble.

Objects of a mobile station to perform a random access procedure for a network may include initial access, handover, a scheduling request, timing alignment, and so on.

A UE has performed a random access using one carrier in a conventional single carrier system. But with regards to current CA support, the UE is able to support the random access with multiple component carriers. There is a need for the detailed random access procedure of a UE in multiple component carrier system.

SUMMARY

An object of the present invention is to provide a method and apparatus for performing uplink synchronization in a wireless communication system.

Another object of the present invention is to provide an apparatus and method for configuring a message including a group for performing uplink synchronization and a timing alignment value (TAV) in a wireless communication system.

Yet another object of the present invention is to provide an apparatus and method for transmitting a TAV which is applied to a plurality of SSCs in common.

Further yet another object of the present invention is to provide an apparatus and method for obtaining a TAV which is applied to a plurality of SSCs in common through a single message.

Further yet another object of the present invention is to provide an apparatus and method for transmitting a Medium Access Control (MAC) message including a TAV for each SSC group.

Further yet another object of the present invention is to provide an apparatus and method for classifying a group including SSCs to which the same TAV is applied.

Further yet another object of the present invention is to provide an apparatus and method for generating a message indicating a group including a SSC to which the same TAV is applied.

Further yet another object of the present invention is to provide an apparatus and method for checking a TAV for each group including SSC based on a MAC message.

In accordance with an aspect of the present invention, there is provided a mobile station, including a reception unit for receiving TAG configuration information on which at least one serving cell configured in the mobile station is classified as a Timing Alignment Group (TAG) from a base station and a transmission unit for transmitting a random access preamble to the base station on one representative serving cell within the TAG.

The reception unit receives a random access response message, including a Timing Advance Command (TAC) field from the base station in response to the random access preamble, and the TAC field indicates a TAV on which the uplink timing of all the serving cells within the TAG is identically adjusted.

In accordance with another aspect of the present invention, there is provided a method of a mobile station performing random access in a wireless communication system. The method of performing random access includes receiving TAG configuration information on which at least one serving cell configured in the mobile station is classified as a TAG from a base station, transmitting a random access preamble to the base station on one representative serving cell within the TAG, and receiving a random access response message, including a TAC field, from the base station in response to the random access preamble.

The TAC field indicates a TAV on which the uplink timing of all the serving cells within the TAG is identically adjusted.

In accordance with yet another aspect of the present invention, there is provided a base station performing random access in a wireless communication system. The base station includes a Radio Resource Control (RRC) processing unit for generating TAG configuration information on which at least one serving cell configured in a mobile station is classified as a TAG, a transmission unit for transmitting the TAG configuration information to the mobile station, a reception unit for receiving a random access preamble from the mobile station on one representative serving cell within the TAG, a random access processing unit for generating a random access response message including a TAC field indicating a TAV on which the uplink timing of all the serving cells within the TAG is identically adjusted in response to the random access preamble, and a transmission unit for transmitting the random access response message to the mobile station.

In accordance with further yet another aspect of the present invention, there is provided a method of a base station performing random access in a wireless communication system. The method of performing random access includes transmitting TAG configuration information on which at least one serving cell configured in a mobile station is classified as a TAG to the mobile station, receiving a random access preamble from the mobile station on one representative serving cell within the TAG, and transmitting a random access response message, including a TAC field indicating a TAV on which the uplink timing of all serving cells within the TAG is identically adjusted to the mobile station in response to the random access preamble.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

FIG. 9 shows an example of a MAC sub-header according to an example of the present invention;

DETAILED DESCRIPTION OF THE EXEMPLARY EMBODIMENTS

Figure 1:
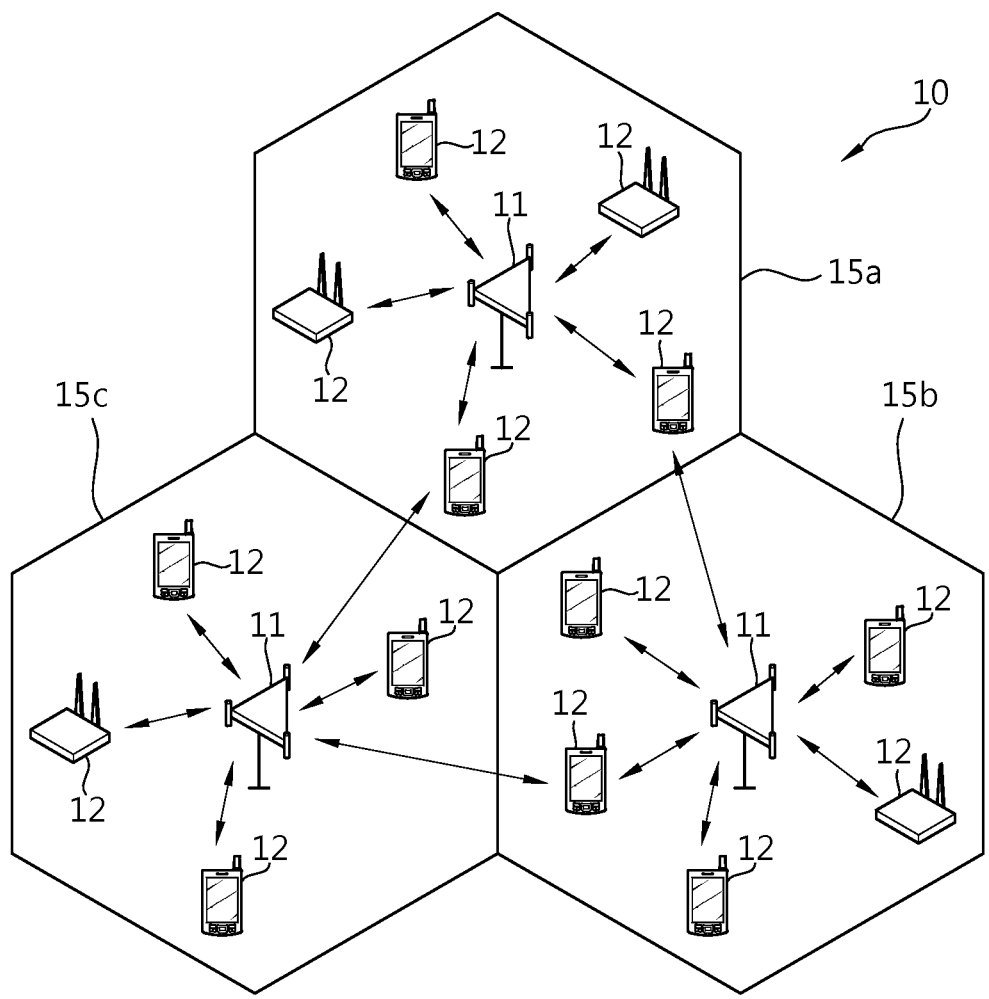
FIG. 1 shows a wireless communication system to which the present invention is applied.

Hereinafter, in this specification, some exemplary embodiments are described in detail with reference to the accompanying drawings. It is to be noted that in assigning reference numerals to elements in the drawings, the same reference numerals designate the same elements throughout the drawings although the elements are shown in different drawings. Furthermore, in describing the embodiments of the present invention, a detailed description of the known functions and constructions will be omitted if it is deemed to make the gist of the present invention unnecessarily vague.

Furthermore, this specification is focused on a wireless communication network. Tasks performed in the wireless communication network may be performed in a process in which a system (e.g., a base station) managing the wireless communication network controls the wireless communication network and transmits data or may be performed in a mobile station associated with the wireless communication network.

FIG. 1 shows a wireless communication system to which the present invention is applied.

Referring to FIG. 1, the wireless communication systems 10 are widely deployed in order to provide various communication services, such as voice and packet data. The wireless communication system 10 includes at least one Base Station (BS) 11. Each BS 11 provides communication service to specific cells 15a, 15b, and 15c. Each of the cells may be classified into a plurality of areas (called sectors).

A user equipment (UE) 12 may be fixed or mobile and may also be called another terminology, such as a mobile station (MS), a Mobile Terminal (MT), a User Terminal (UT), a Subscriber Station (SS), a wireless device, a Personal Digital Assistant (PDA), a wireless modem, or a handheld device. The BS 11 may also be called another terminology, such as an evolved-NodeB (eNB), a Base Transceiver System (BTS), an access point, a femto BS, a home nodeB, or a relay. The cell should be interpreted as a comprehensive meaning that indicates some of a region covered by the BS 11, and it has a meaning to cover various coverage regions, such as a mega cell, a macro cell, a micro cell, a pico cell, an a femto cell.

Hereinafter, downlink (DL) refers to communication from the BS 11 to the UE 12, and uplink (UL) refers to communication from the UE 12 to the BS 11. In downlink, a transmitter may be a part of the BS 11, and a receiver may be a part of the UE 12. In UL, a transmitter may be a part of the UE 12, and a receiver may be a part of the BS 11. Multiple access schemes applied to the wireless communication system are not limited. A variety of multiple access schemes, such as Code Division Multiple Access (CDMA), Time Division Multiple Access (TDMA), Frequency Division Multiple Access (FDMA), Orthogonal Frequency Division Multiple Access (OFDMA), Single Carrier-FDMA (SC-FDMA), OFDM-FDMA, OFDM-TDMA, and OFDM-CDMA, may be used. In uplink transmission and downlink transmission, a Time Division Duplex (TDD) method of performing transmission using different times may be used or a Frequency Division Duplex (FDD) method of performing transmission using different frequencies may be used.

A Carrier Aggregation (CA) is to support a plurality of CCs and also called a spectrum aggregation or a bandwidth aggregation. Each of individual unit carriers aggregated by a CA is called a Component Carrier (hereinafter referred to as a 'CC'). Each CC is defined by the bandwidth and the center frequency. The CA is introduced in order to support an increasing throughput, prevent an increase of costs due to the introduction of a broadband Radio Frequency (RF) device, and guarantee compatibility with the existing system. For example, assuming that 5 CCs are allocated as the granularity of a carrier unit having a bandwidth of 20 MHz, a maximum bandwidth of 100 MHz can be supported.

The size (i.e., a bandwidth) of CCs may be different. For example, if 5 CCs are used in order to configure a band of 70 MHz, the band may have 5 MHz CC (carrier #0)+20 MHz CC (carrier #1)+20 MHz CC (carrier #2)+20 MHz CC (carrier #3)+5 MHz CC (carrier #4).

Hereinafter, a multiple CC system refers to a system supporting a carrier aggregation. In a multiple CC system, a contiguous carrier aggregation and/or a non-contiguous carrier aggregation may be used. Furthermore, either a symmetrical aggregation or an asymmetrical aggregation may be used.

Figure 2:
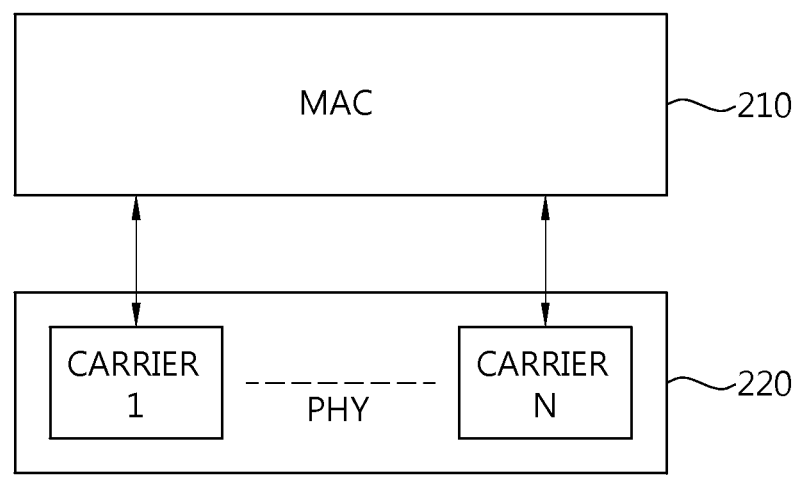
FIG. 2 shows an example of a protocol structure for supporting multiple carriers to which the present invention is applied.

FIG. 2 shows an example of a protocol structure for supporting multiple carriers to which the present invention is applied.

Referring to FIG. 2, a Medium Control Access (MAC) entity 210 manages a physical layer (PHY) 220 using a plurality of carriers. A MAC management message transmitted through a specific carrier may be applied to other carriers. That is, the MAC management message is a message which may control other carriers including the specific carrier. The physical layer 220 may be operated in a Time Division Duplex (TDD) scheme and/or in a Frequency Division Duplex (FDD) scheme.

Some physical control channels are used in the physical layer 220. A Physical Downlink Control Channel (PDCCH) informs a UE of the resource allocation of a Paging CHannel (PCH) and a downlink shared channel (DL-SCH) and of information about a Hybrid Automatic Repeat Request (HARQ) related to the DL-SCH. The PDCCH may carry an UL grant that informs a UE of the resource allocation of uplink transmission. A Physical Control Format Indicator Channel (PCFICH) informs a UE of the number of OFDM symbols used in PDCCHs, and it is transmitted per subframe. A Physical Hybrid ARQ Indicator Channel (PHICH) carries an HARQ ACK/NAK signal in response to uplink transmission. A Physical Uplink Control Channel (PUCCH) carries HARQ ACK/NAK for downlink transmission, a scheduling request, and UL control information, such as CQI. A Physical Uplink Shared Channel (PUSCH) carries an uplink shared channel (UL-SCH). A Physical Random Access Channel (PRACH) carries a random access preamble.

Figure 3:
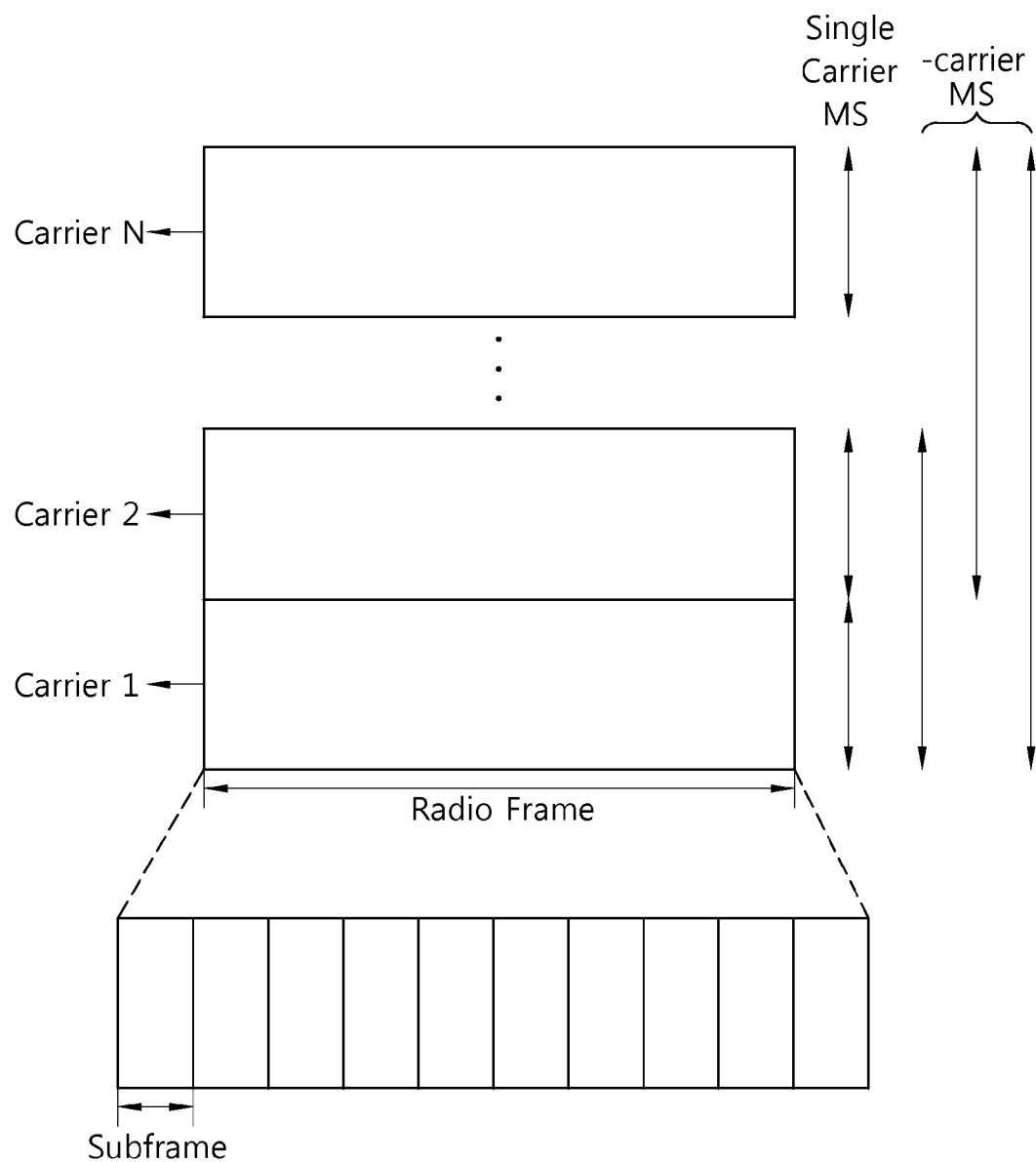
FIG. 3 shows an example of a frame format for a multiple carrier operation to which the present invention is applied.

FIG. 3 shows an example of a frame format for a multiple carrier operation to which the present invention is applied.

Referring to FIG. 3, a frame includes 10 subframes. Each of the subframes includes a plurality of OFDM symbols. Each of the carriers may carry its own control channel (e.g., a PDCCH). Multiple carriers may be contiguous to each other or may not be contiguous to each other. A UE may support one or more carriers according to its capabilities. Here, physical control format indicator channel (PCFICH) is mapped to the first OFDM symbol among the plurality OFDM symbols to indicate a region on which PDCCH is transmitted through a DL CC.

Figure 4:
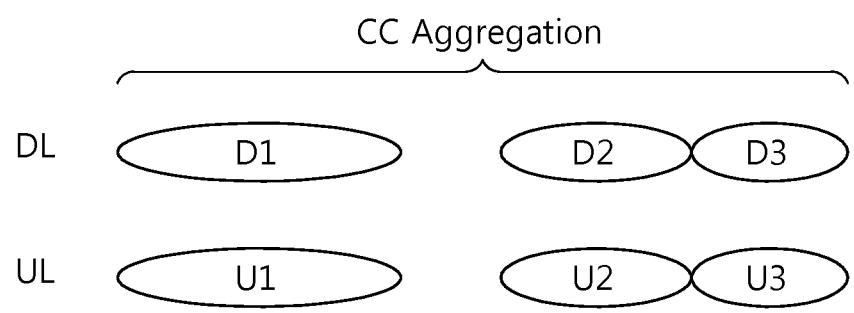
FIG. 4 shows a simple concept of a multiple carrier system.

FIG. 4 shows a simple concept of a multiple carrier system.

Referring to FIG. 4, in an aspect, DL CCs D1, D2, and D3 are aggregated and uplink CCs (hereinafter referred to as 'UL CCs') U1, U2, and U3 are aggregated. Here, Di is the index of a DL CC, and Ui is the index of a UL CC (where i=1, 2, 3). Each of the indices is not always equal to the sequence of CC or frequency band for the corresponding CC.

At least one DL CC may be configured as a PCC, and the remaining CCs may be configured as SCCs. And at least one UL CC may be configured as a PCC, and the remaining CCs may be configured as SCCs. For example, D1 and U1 may be PCCs, and D2, U2, D3, and U3 may be SCCs.

Here, the index of the PCC may be set to 0, and one of natural number other than 0 may be the index of the SCC. Furthermore, the indices of DL/UL CCs may be set identically with the indices of CCs (or serving cells) including the relevant DL/UL CCs. For another example, only a CC index or an SCC index may be set, and UL/DL CC indices included in the relevant CCs may not exist.

In an FDD system, a DL CC and a UL CC may be linked to each other in a one-to-one manner. D1 and U1, D2 and U2, and D3 and U3 may be linked to each other in a one-to-one manner. A UE sets up linkages between DL CCs and UL CCs on the basis of system information transmitted on a logical channel BCCH or a UE-dedicated RRC message transmitted on a DCCH. Each linkage may be set up in a cell-specific manner or a UE-specific manner. This linkage is called System Information Block 1 (SIB1) linkage or System Information Block 2 (SIB2) linkage. Each linkage may be set up in a cell-specific or UE-specific manner. For example, a PCC may be configured in a cell-specific manner, and an SCC may be configured in a UE-specific manner.

Here, not only the 1:1 linkage between the DL CC and the UL CC but also a 1:n or n:1 linkage may also be set up or established.

A DL CC corresponding to a PSC is called a DL PCC, and a UL CC corresponding to a PSC is called a UL PCC. Furthermore, in downlink, a CC corresponding to an SSC is called a DL SCC. In uplink, a CC corresponding to an SSC is called a UL SCC. Only DL CC may correspond to one serving cell, or both a DL CC and a UL CC may correspond to one serving cell.

A Primary Serving Cell (PSC) refers to one serving cell which provides security input and NAS mobility information in an RRC establishment or re-establishment state. At least cell may be configured to form a set of serving cells along with a PSC according to the capabilities of a UE. The at least one cell is called a Secondary Serving Cell (SSC). Accordingly, a set of serving cells configured for one UE may include only one PSC or may include one PSC and at least one SSC.

As described above, in a multiple CC system, a concept that communication between a UE and a BS is performed through a DL CC or a UL CC is the same as a concept that communication between a UE and a BS is performed through a serving cell. For example, in a method of performing a random access procedure according to the present invention, a concept that a UE transmits a preamble using a UL CC may be considered as the same concept that a UE transmits a preamble using a PSC or SSC. Furthermore, a concept that a UE receives DL information using a DL CC may be considered as the same concept that a UE receives DL information using a PSC or SSC.

A PSC and an SSC have the following characteristics.

First, a PSC is used for the transmission of a PUCCH. In contrast, an SSC is unable to transmit a PUCCH, but able to transmit some of pieces of control information within a PUCCH through a PUSCH.

Second, a PSC is always activated, whereas an SSC is activated or deactivated according to a specific condition. The specific condition may include that the SSC has received the activation/deactivation MAC CE message of an eNB or a deactivation timer within a UE has expired.

Third, when a PSC experiences a Radio Link Failure (RLF), RRC re-establishment is triggered, or when an SSC experiences an RLF, RRC re-establishment is not triggered. An RLF is generated when DL capabilities equal to or lower than a critical value are maintained for a specific time or higher or an RACH has failed critical times or more.

Fourth, a PSC may be changed by a change of a security key or may be changed by a handover procedure accompanied by an RACH procedure. However, in case of a Contention Resolution (CR) message, only a PDCCH indicating CR must be transmitted through a PSC, and CR information may be transmitted through a PSC or SSC.

Fifth, Non-Access Stratum (NAS) information is received through a PSC.

Sixth, a PSC always consists of a pair of a DL PCC and a UL PCC.

Seventh, a different CC may be configured as a PSC for each UE.

Eighth, procedures, such as the reconfiguration, addition, and removal of an SSC, may be performed by a Radio Resource Control (RRC) layer. In adding a new SSC, RRC signaling may be used to transmit system information about a dedicated SSC.

Ninth, a PSC may provide both a PDCCH (e.g., downlink allocation information or uplink grant information) allocated to a UE-specific search space which is configured in order to transmit control information to only a specific UE within a region where the control information is transmitted and a PDCCH (e.g., System Information (SI), a Random Access Response (RAR), and Transmit Power Control (TPC)) allocated to a Common Search Space (CSS) which is configured in order to transmit control information to all UEs within a cell or a plurality of UEs matching with a specific condition.

In contrast, an SSC may be configured for only a UE-specific search space. That is, since a UE cannot check a CSS through an SSC, the UE is unable to receive pieces of control information transmitted only through the CSS and pieces of data information indicated by the pieces of control information.

From among SSCs, an SSC in which a CSS may be defined may be defined. This SSC is called a special SSC. The SCell is always configured as a scheduling cell at the time of cross-carrier scheduling. Furthermore, a PUCCH configured for a PSC may be defined for an SCell.

The PUCCH for an SCell may be fixedly configured when an SCell is configured or may be allocated (configured) or released by an RRC reconfiguration message when a BS reconfigures a relevant SSC.

The PUCCH for the SCell includes ACK/NACK information or Channel Quality Information (CQI) about SSCs which exist within a relevant sTAG. As described above, a BS may configure the PUCCH for an SCell through RRC signaling.

Furthermore, a BS may configure one SCell from among a plurality of SSCs or may not configure an SCell. The reason why a BS does not configure an SCell is that it is determined that a CSS and a PUCCH do not need to be configured. For example, if it is determined that a contention-based random access procedure does not need to be performed in any SSC or if it is determined that the capacity of the PUCCH of a current PSC is sufficient, a PUCCH for an additional SSC does not need to be configured.

In a wireless communication environment, while electric waves are propagated from a transmitter and transferred to a receiver, the electric waves experience propagation delay. Accordingly, although both the transmitter and the receiver precisely know the time that the electric waves are propagated from the transmitter, the time that a signal takes to reach the receiver is influenced by the distance between the transmitter and the receiver, a surrounding electric wave environment, etc. If the receiver is moving, the time is also changed. If the receiver does not precisely know the time taken for the signal to be received from the transmitter, the receiver does not receive the signal, or communication is impossible although the signal is received because a distorted signal is received.

Accordingly, in a wireless communication system, in order to receive an information signal in both downlink/uplink, synchronization must be performed between a BS and a UE. The type of synchronization includes frame synchronization, information symbol synchronization, sampling period synchronization, and so on. Sampling period synchronization must be obtained most basically in order to distinguish physical signals from one another.

DL synchronization is obtained by a UE on the basis of the signal of a BS. The BS transmits an agreed signal so that the UE may easily obtain downlink synchronization. The UE must be able to precisely know the time when a specific signal was sent from the BS. In case of downlink, since one BS transmits the same synchronization signal to a plurality of UEs at the same time, the UEs may obtain synchronization independently.

In case of uplink, a BS receives signals transmitted by a plurality of UEs. If the distance between each UE and each BS is different, a signal received by each BS has a different transmission delay time. If uplink information is transmitted on the basis of obtained downlink synchronization, a relevant BS receives information about each UE on a different time. In this case, the BS is unable to obtain synchronization on the basis of any one UE. Accordingly, in order to obtain uplink synchronization, a different procedure from that of downlink is necessary.

Meanwhile, a need to obtain uplink synchronization may be different according to a multiple access scheme. For example, in case of a CDMA system, although a BS receives the uplink signals of different UEs on different times, the BS may separate the uplink signals from one another. However, in a wireless communication system based on OFDMA or FDMA, a BS demodulates the uplink signals of all UEs at once and at the same time. Accordingly, reception performance is increased as the uplink signals of a plurality of UEs are received on precise time, but reception performance is suddenly deteriorated as a difference between the times when the uplink signals of UEs are received is increased. Accordingly, it is indispensable to obtain uplink synchronization.

An exemplary method to obtain or acquire the uplink synchronization (in other words, uplink timing adjustment or uplink timing alignment) is a random access procedure. During a random access procedure, a UE obtains uplink synchronization on the basis of a Timing Alignment Value (TAV) transmitted from a BS. A TAV may be called a timing advance value in that the TAV has a value that advances the uplink timing. Alternatively, a TAV may also be called a timing adjustment value. A random access procedure is used to obtain a TAV for the uplink timing synchronization of an SSC.

If uplink synchronization is obtained, a UE starts a Time Alignment Timer (TAT). While a TAT is operated, a UE and a BS determine that they have been uplink-synchronized. If a TAT expires or a TAT is not operated, a UE and a BS determine that they have not been synchronized with each other, and thus the UE does not perform uplink transmission other than the transmission of a random access preamble.

Meanwhile, in a multiple carriers system, one UE performs communication with a BS through a plurality of CCs or a plurality of serving cells. If all signals transmitted from a UE to a BS through a plurality of serving cells have the same time delay, the UE may obtain uplink synchronization for all serving cells through only one TAV. In contrast, if signals transmitted from a UE to a BS through a plurality of serving cells have different time delays, a different TAV is required for each serving cell. In this case, several TAVs may exist. They are called multiple TAVs. Furthermore, an uplink synchronization procedure related to multiple TAVs is called Multiple Timing Alignment (M-TA) or Multiple Timing Advance (M-TA).

If a UE performs a random access procedure for each serving cell in order to obtain multiple TAVs, overhead is generated in limited uplink resources, and the complexity of random access may be increased. In order to reduce the overhead and the complexity, a Timing Alignment Group (TAG) is defined. A TAG may also be called a timing advance group. And the pTAG indicates a TAG including a PSC, and the sTAG indicates a TAG not including a PSC.

A serving BS and a UE may perform the following operations in order to obtain and maintain a Timing Alignment Value (TAV) for each of TAGs.

1. A serving BS and a UE obtain and maintain the TAV of a pTAG through a PSC. Furthermore, a timing reference, that is, a criterion for calculating and applying the TAV of a pTAG always becomes a DL CC within a PSC.

2. In order to obtain an initial UL TAV for an sTAG, a non-contention-based RA procedure initialized by a BS is used.

3. One of activated SSCs may be used as a timing reference for an sTAG. However, it is assumed that there is no change of an unnecessary timing reference.

4. Each TAG has one timing reference and one Timing Alignment Timer (TAT). Furthermore, each TAT may include a different timer expiration value. A TAT is started or restarted right after a TAV is obtained from a serving BS in order to inform the validity of a TAV that has been obtained and applied by each TAG.

5. If the TAT of a pTAG is not operated, a TAT for all sTAG should not be operated. That is, if the TAT of a pTAG expires, the TAT of all TAGs including the pTAG expires. If a TAT for a pTAG is not operated, a TAT for all sTAG cannot be started.

A. If the TAT of a pTAG expires, a UE flushes the HARQ buffers of all serving cells. Furthermore, the UE clears a resource allocation configuration for all downlink and uplink. For example, like Semi-Persistent Scheduling (SPS), if periodic resource allocation is configured without control information transmitted for the purpose of resource allocation for downlink/uplink, such as a PDCCH, a UE clears an SPS configuration. Furthermore, a UE releases the configuration of the PUCCHs and type 0 (periodic) SRS of all serving cells.

6. If only the TAT of an sTAG expires, the following procedure is performed.

A. SRS transmission through the UL CCs of SSCs within an sTAG is stopped.

B. A type 0 (periodic) SRS configuration is released. A type 1 (aperiodic) SRS configuration is maintained.

C. Configuration information about a CSI report is maintained.

D. HARQ buffers for uplink of SSCs within an sTAG are flushed.

7. If a TAT for an sTAG is performed, although all SSCs within the sTAG are deactivated, a UE performs the TAT of the sTAG without stopping the TAT of the sTAG. It means that the validity of the TAV of the relevant sTAG can be guaranteed through the TAT although all the SSCs within the sTAG are deactivated and thus a situation in which any SRS and uplink transmission for tracing uplink synchronization are not performed is maintained for a specific time.

8. If the last SSC within an sTAG is removed, that is, any SSC is not configured within the sTAG, a TAT within the sTAG is stopped.

9. A random access procedure for an SSC may be performed when a BS transmits a PDCCH order, indicating the start of the random access procedure, to an activated SSC through a PDCCH, that is, a physical layer control information channel. The PDCCH order includes random access preamble index information which may be used in an SSC within the sTAG of a relevant UE and PRACH mask index information which permits the transmission of a random access preamble to all or some of time/frequency resources available for the relevant SSC. Accordingly, the random access procedure for the SSC is performed only through a non-contention-based random access procedure. Here, in order to indicate the non-contention-based random access procedure, random access preamble information included in the PDCCH order must be indicated by information other than '000000'.

10. A PDCCH and a PDSCH for transmitting a Random Access Response (RAR) message may be transmitted through a PSC.

11. When the number of times that the random access preamble of an SSC is retransmitted reaches a maximum permissible retransmission number: A) An MAC layer stops a random access procedure. B) An MAC layer does not inform an RRC layer that a random access procedure has failed. Accordingly, the triggering of a Radio Link Failure (RLF) is not caused. C) A UE does not inform a BS that the random access procedure of an SSC has failed.

12. The path attenuation reference of a pTAG may become a PSC or an SSC within a pTAG, and a BS may differently set the path attenuation reference for each serving cell within a pTAG through RRC signaling.

13. The path attenuation reference of the UL CCs of each of serving cells within an sTAG is an SIB2-linked DL CC. Here, the meaning that the path attenuation reference has been SIB2-linked means that a linkage between a DL CC configured based on information within the SIB1 of a relevant SSC and a UL CC configured based on information within the SIB2. Here, the SIB2 is one of system information blocks transmitted through a broadcasting channel, and the SIB2 is transmitted from a BS to a UE through an RRC reconfiguration procedure when an SSC is configured. Uplink center frequency information is included in the SIB2, and downlink center frequency information is included in the SIB1.

Figure 5:
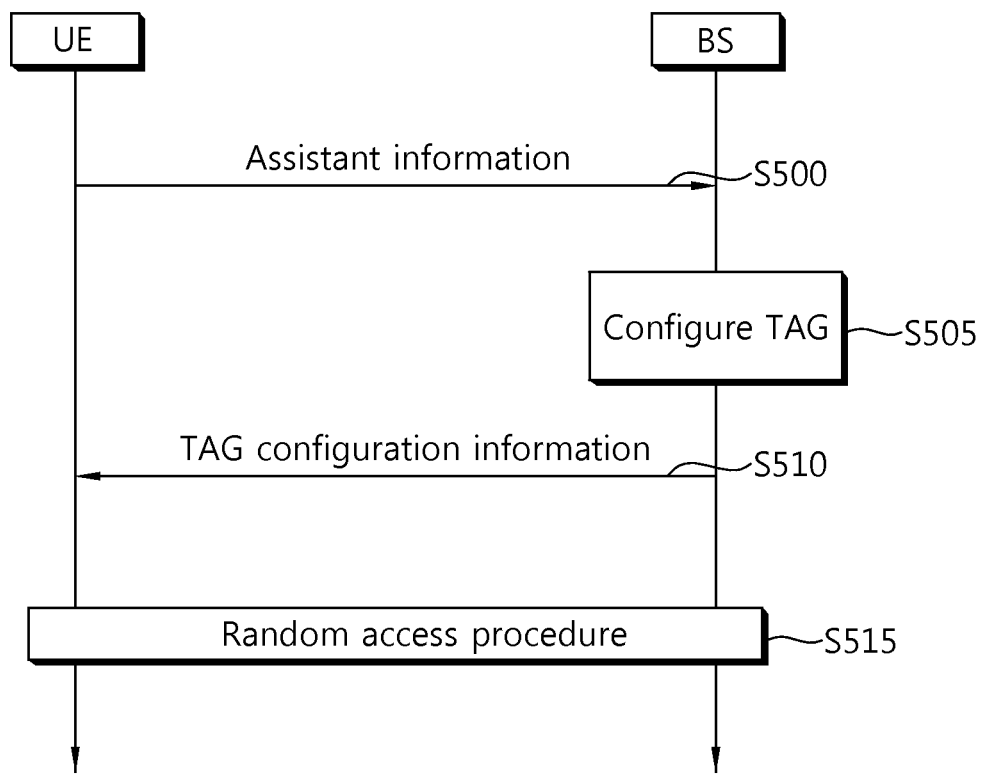
FIG. 5 is a flowchart illustrating a method of transmitting TAG configuration information according to an example of the present invention.

FIG. 5 is a flowchart illustrating a method of transmitting TAG configuration information according to an example of the present invention.

Referring to FIG. 5, a UE transmits classifying assistant information to a BS at step S500. The classifying assistant information provides information or a criterion which is necessary to classify at least one serving cell, configured in a UE, as a TAG. For example, the classifying assistant information may include at least one of geographical position information about a UE, neighbor cell measurement information about a UE, network deployment information, and serving cell configuration information. The geographical position information of a UE indicates a position which may be represented by the latitude, altitude, and height of the UE. The neighbor cell measurement information of a UE includes Reference Signal Received Power (RSRP) of a reference signal transmitted from a neighbor cell or Reference Signal Received Quality (RSRQ) of a reference signal. The network deployment information indicates the deployment of a BS, a Frequency Selective Repeater (FSR), or a Remote Radio Head (RRH). The serving cell configuration information is information about a serving cell configured for a UE. The step S500 indicates that the UE transmits the classifying assistant information to the BS, but the BS may know the classifying assistant information additionally or may already have the classifying assistant information. In this case, a random access procedure according to the present embodiment may be performed without the step S500.

The BS configures a TAG by classifying serving cells at step S505. The serving cells may be classified into TAGs or configured as TAGs based on the classifying assistant information. The TAG may be defined as follows. The TAG is a group of at least one serving cell, and the same TAV is applied to serving cells within a TAG. For example, if a first serving cell and a second serving cell belong to the same TAG TAG1, the same TAV TA1 is applied to the first serving cell and the second serving cell. In contrast, if the first serving cell and the second serving cell belong to different TAGs TAG1 and TAG2, different TAVs $TA_1$ and $TA_2$ are applied to the first serving cell and the second serving cell, respectively. The TAG may include a PSC, may include at least one SSC, or may include a PSC and at least one SSC. Alternatively, the TAG may be defined as a group of serving cell(s) which use the same TAV and the same timing reference. Alternatively, the TAG may be a group using a timing reference cell including timing reference. Here, the timing reference is a DL CC which is a criterion for calculating the TAV.

For example, a BS may configure a TAG in a UE-specific manner. Serving cell configuration information is configured for each UE individually and independently. Thus, if the serving cell configuration information is used as classifying assistant information, a TAG may be configured for each UE individually and independently. For example, it is assumed that TAGs for a first UE include TAG1_UE1 and TAG2_UE1 and TAGs for a second UE include TAG1_UE2 and TAG2_UE2. If first and second serving cells are configured for the first UE, TAG1_UE1={the first serving cell}, and TAG2_UE1={the second serving cell}. In contrast, if first to fourth serving cells are configured for the second UE, it may result in AG1_UE2={the first serving cell, the second serving cell} and TAG2_UE2={the third serving cell, the fourth serving cell}.

For another example, the BS may configure the TAG in a cell-specific manner. Network deployment information is determined irrespective of a UE. Thus, if the network deployment information is used as classifying assistant information, a TAG may be configured in a cell-specific manner irrespective of a UE. For example, it is assumed that the first serving cell of a specific frequency band is always served by a frequency selective repeater or a remote radio head and the second serving cell of a specific frequency band is served through a BS. In this case, the first serving cell and the second serving cell are classified as different TAGs for all UEs within the service area of the BS.

The BS transmits TAG configuration information to the UE at step S510. The TAG configuration information includes information describing the state in which TAGs are configured, and includes classifying at least one serving cell configured in the UE into a TAG.

For example, the TAG configuration information may include the number field of the TAG, the index field of the TAG, and the index field of each of the serving cells included in the TAG, and the fields describe the state in which the TAG has been configured.

For another example, the TAG configuration information may further include information on a representative serving cell within each TAG. A representative serving cell is a serving cell capable of performing a random access procedure for maintaining and configuring uplink synchronization within each TAG. The representative serving cell may also be called a special serving cell (special SCell) or a reference serving cell (reference SCell). Unlike in the above embodiment, if TAG configuration information does not include a representative serving cell, a UE may select a representative serving cell within each TAG.

The UE performs a random access procedure for the BS at step S515.

Figure 6:
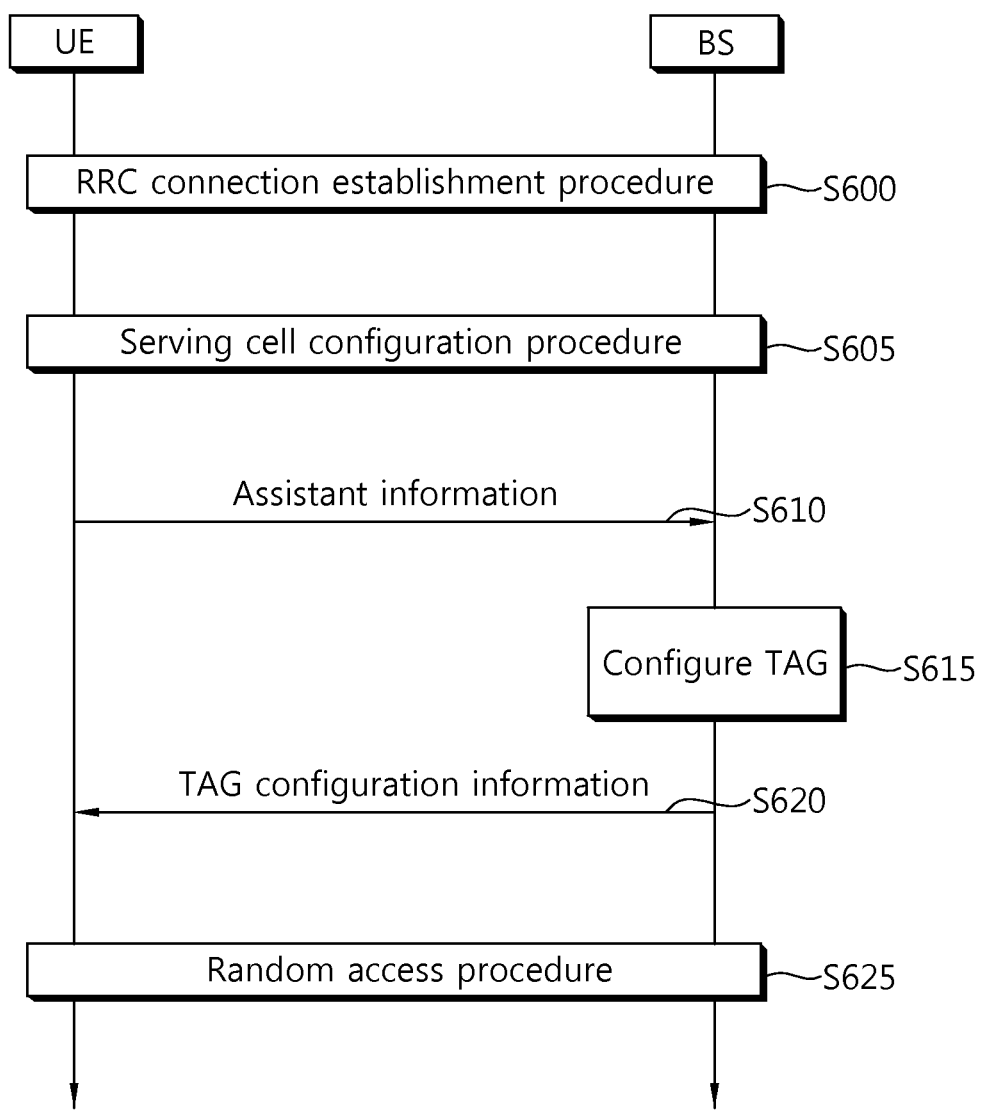
FIG. 6 is a flowchart illustrating a method of transmitting TAG configuration information according to another example of the present invention.

FIG. 6 is a flowchart illustrating a method of transmitting TAG configuration information according to another example of the present invention.

Referring to FIG. 6, if a UE in a Radio Resource Control (RRC) idle mode cannot aggregate CCs and only a UE in an RRC connected mode can aggregates CCS, a relevant UE selects a cell for RRC connection prior to the CC aggregation and performs an RRC connection establishment procedure for a BD through the selected cell at step S600. The RRC connection establishment procedure is performed in such a manner that the UE transmits an RRC connection request message to the BS, the BS transmits RRC connection setup to the UE, and the UE transmits an RRC connection establishment completion message to the BS. The RRC connection establishment procedure includes the configuration of an SRB1.

Meanwhile, the cell for RRC connection is selected using the following selection conditions as criteria.

(i) The most suitable cell which will attempt RRC connection may be selected on the basis of information measured by a UE. As the measurement information, the UE takes both RSRP regarding measured receive power on the basis of the received Cell-specific Reference Signal (CRS) of a specific cell and RSRQ defined as a ratio of the entire receive power (numerator) to an RSRP value (denominator) for the specific cell into consideration. Accordingly, the UE obtains the RSRP and RSRQ values for each of distinguishable cells and selects the most suitable cell based on the RSRP and RSRQ values. For example, the UE may select a cell whose RSRP and RSRQ values are 0 dB or more and RSRP value is a maximum, the UE may select a cell whose RSRQ value is a maximum, or the UE may set (e.g., 7:3) weight to each of the RSRP and RSRQ values and select a cell on the basis of a mean value by taking the weight into consideration.

(ii) A UE may attempt RRC connection by using information which is stored in its internal memory and related to a service provider (PLMN) fixedly set in a system or downlink center frequency information or cell ID information (e.g., a Physical cell ID (PID)). The stored information may include pieces of information about a plurality of service providers and cells, and priority or priority weight may be set to each of the pieces of information.

(iii) A UE may receive system information transmitted by a BS through a broadcasting channel, check information within the received system information, and attempt RRC connection based on the checked information. For example, a UE has to check whether a cell is a specific cell (e.g., a Closed Subscribe Group (CSG) or a non-allowed Home BS) requiring a membership for cell access. Accordingly, the UE receives system information transmitted by each BS and checks CSG ID information indicating a CSG. If the specific cell is checked to belong to the CSG, the UE checks whether the CSG is an accessible CSG. In order to check the accessibility, the UE may use its own membership information and unique information about a CSG cell (e.g., (Evolved) Cell Global ID ((E)CGI or PCI information within system information). If the specific cell is determined as an inaccessible BS through the check procedure, the UE does not attempt RRC connection.

(iv) A UE may attempt RRC connection through valid CCs stored in its internal memory (e.g., CCs that may be configured within a frequency band supportable by the UE in implementation).

The conditions (ii) and (iv) of the four selection conditions are optional, but the conditions (i) and (iii) condition are mandatory.

In order to attempt RRC connection through a cell selected for the RRC connection, a UE has to check an uplink band on which an RRC connection request message will be transmitted. Accordingly, the UE receives system information through a broadcasting channel transmitted through the downlink of the selected cell. A System Information Block 2 (SIB2) includes bandwidth information and center frequency information about a band to be used as UL. Accordingly, the UE attempts RRC connection through the downlink of the selected cell and the uplink band linked to the downlink through pieces of information within the SIB2. Here, the UE may transfer the RRC connection request message to the BS as uplink data within a random access procedure. If the RRC connection procedure is successful, an RRC connection-established cell may be called a PSC, and the PSC includes a DL PCC and a UL PCC.

If more radio resources have to be allocated to the UE at the request of the UE, at the request of a network, or according to the determination of the BS, the BS performs an RRC connection reconfiguration procedure for additionally configuring one or more SSCs (SCells) in the UE at step S605. The RRC connection reconfiguration procedure is performed in such a manner that the BS transmits an RRC connection reconfiguration message to the UE and the UE transmits an RRC connection reconfiguration completion message to the BS.

The steps S500, S505, S510, and S515 are likewise applied to the following steps S610, S615, S620, and S625, respectively. Meanwhile, the classifying assistant information may be included in the RRC connection reconfiguration completion message at step S605. In this case, the step S610 may be omitted. Furthermore, the step S625 of performing a random access procedure may be performed in a non-contention-based or contention-based manner.

Figure 7:
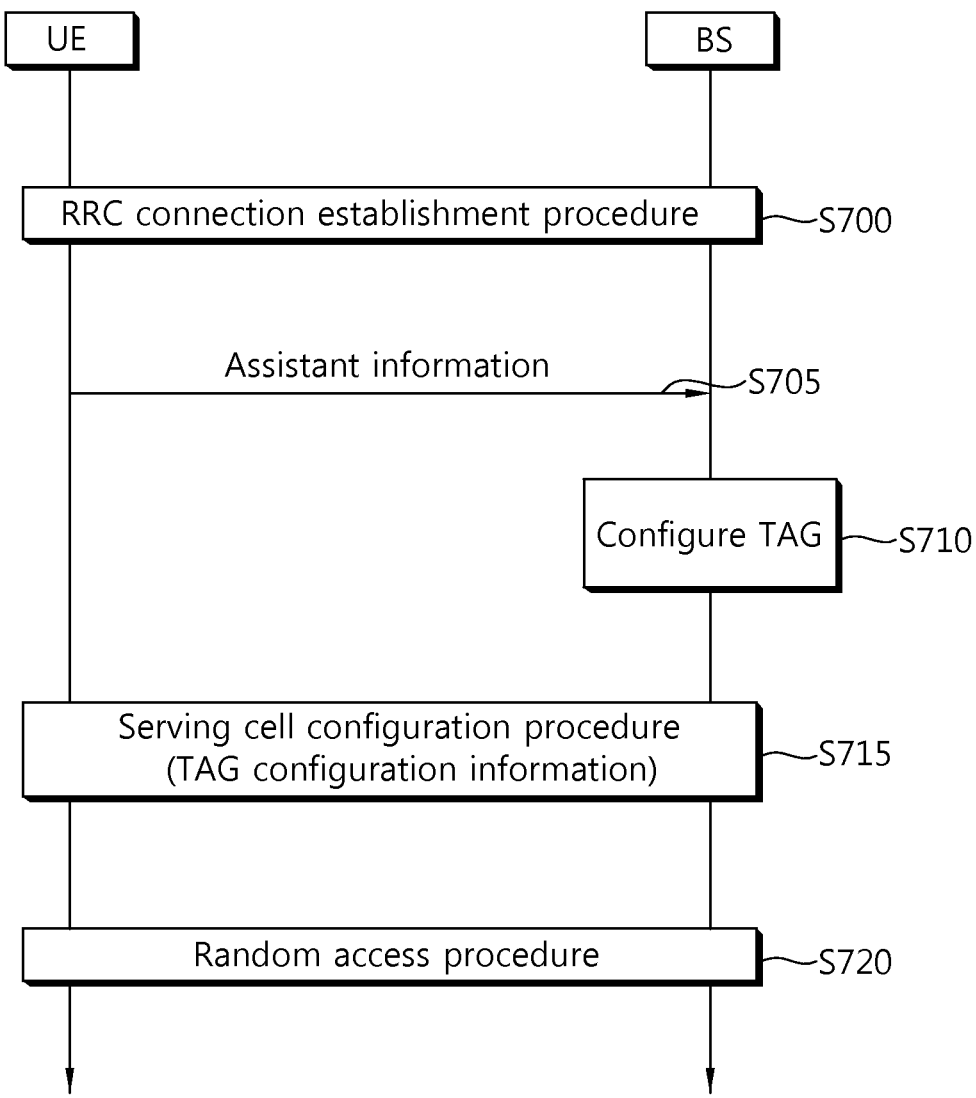
FIG. 7 is a flowchart illustrating a method of transmitting TAG configuration information according to yet another example of the present invention.

FIG. 7 is a flowchart illustrating a method of transmitting TAG configuration information according to yet another example of the present invention.

Referring to FIG. 7, a UE and a BS perform an RRC connection establishment procedure for the BS through a selected cell at step S700. The UE transmits classifying assistant information to the BS at step S705. The classifying assistant information provides information or a criterion necessary to classify one or more serving cells, configured in the UE, as a TAG.

Meanwhile, the BS may have known the classifying assistant information separately or may already have owned the classifying assistant information. In this case, the random access procedure according to the present embodiment may be performed without the step S705.

The BS configures a TAG by classifying the serving cells at step S710. The serving cells may be classified and configured into TAGs based on the classifying assistant information.

If more radio resources have to be configured in the UE at the request of the UE, at the request of a network, or according to the determination of the BS, the BS performs an RRC connection reconfiguration procedure for additionally configuring one or more SSCs in the UE at step S715. In the RRC connection reconfiguration procedure, the BS may transmit an RRC connection reconfiguration message, including TAG configuration information, to the UE. The TAG configuration information describes the state in which the TAG has been configured. For example, the TAG configuration information may include the number field of the TAG, the index field of the TAG, and the index field of each of the serving cells included in the TAG, and the fields describe the state in which the TAG has been configured.

Next, the UE performs a random access procedure at step S720. The random access procedure may be performed in a non-contention-based or contention-based manner.

The UE checks a TAC and/or a TAG index within the random access response message and adjusts uplink timing regarding all the serving cells within the checked TAG by a TAV according to the TAC. An example of the uplink timing adjusted by the TAV is shown in Equation 1 to Equation 4. If TACs and/or TAG indices for a plurality of TAGs exist in the random access response message, the UE adjusts uplink timing regarding serving cell(s) for each TAG by a TAV according to the relevant TAC.

Figure 8:
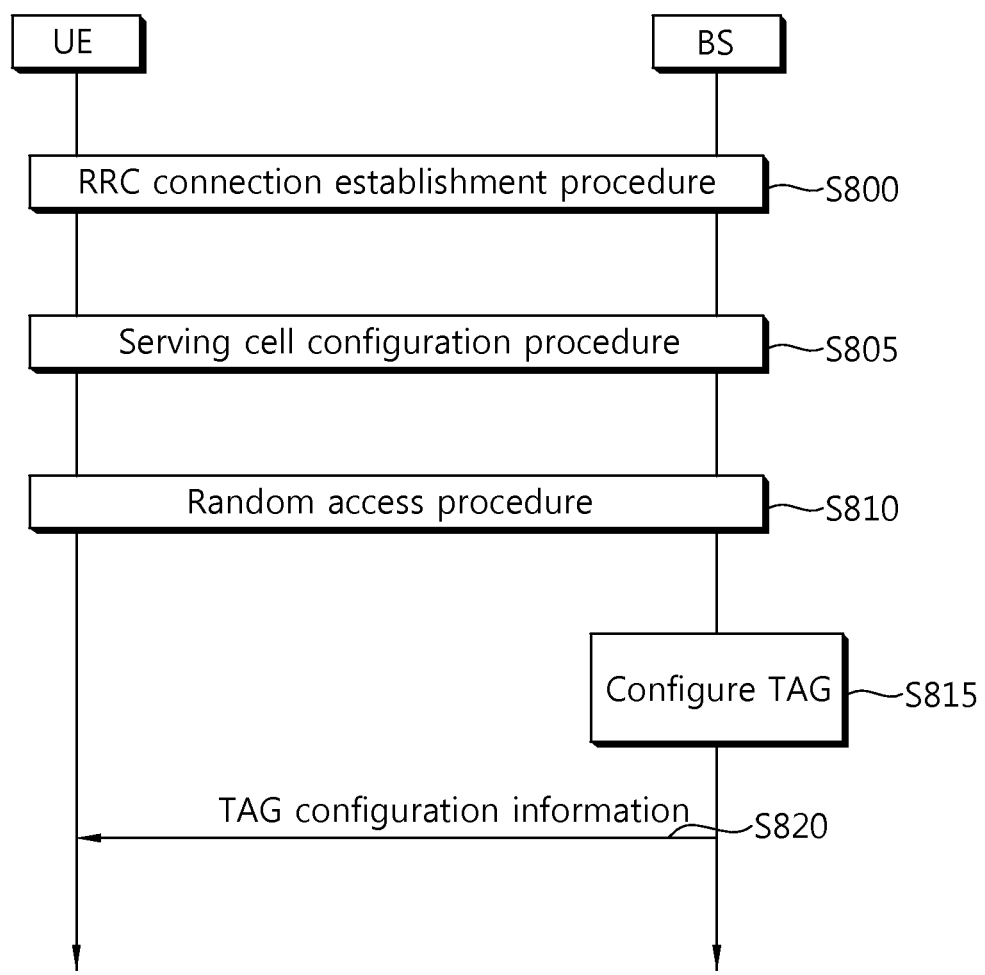
FIG. 8 is a flowchart illustrating a method of transmitting TAG configuration information according to further yet another example of the present invention.

FIG. 8 is a flowchart illustrating a method of transmitting TAG configuration information according to further yet another example of the present invention.

Referring to FIG. 8, a UE and a BS perform an RRC connection establishment procedure for the BS through a selected cell at step S800. The selected cell becomes a PSC. If more radio resources have to be configured in the UE at the request of the UE, at the request of a network, or according to the determination of the BS, the BS performs an RRC connection reconfiguration procedure for additionally configuring one or more SSCs at step S805.

The UE configures one or more SSCs and performs a random access procedure at step S810. The UE transmits a random access preamble to the BS in order to secure timing synchronization for an SSC whose synchronization has not been secured or a newly added or changed SSC. The random access procedure for the SSC may be initiated by a PDCCH order transmitted by the BS. The random access procedure may be performed in a non-contention-based manner or in a contention-based manner according to an intention of the BS.

The BS classifies serving cells configured in the UE on the basis of the random access preamble received at step S810 and configures a TAG based on the classified serving cells at step S815. The TAG is a group including at least one serving cell, and the same TAV is applied to serving cells within a TAG. For example, the BS may configure the TAG in a UE-specific manner. For another example, the BS may configure the TAG in a cell-specific manner.

The BS transmits TAG configuration information to the UE at step S820. The TAG configuration information describes the state in which the TAG has been configured.

For example, the TAG configuration information may include the number field of the TAG, the index field of the TAG, and the index field of each of the serving cells included in the TAG, and the fields describe the state in which the TAG has been configured.

For another example, the TAG configuration information may further include information on a representative serving cell within each TAG. The representative serving cell is a serving cell which may perform a random access procedure for maintaining and setting uplink synchronization within each TAG. Unlike in the above embodiment, if the TAG configuration information does not include a representative serving cell, the UE may independently select a representative serving cell within each TAG.

TAG configuration information is described below. For example, a BS may transmit TAG configuration information to a UE using an RRC message. For example, the TAG configuration information may be included in an RRC connection reconfiguration message used in an RRC connection reconfiguration procedure and then transmitted. Table 1 shows an example of the RRC connection reconfiguration message included in the TAG configuration information.

TABLE 1

| TAG-ConfigDedicated ::= | SEQUENCE { |
| pTAG | SCellListOfTAG, |
| sTAG | SCellListOfTAG, |
| sTAG-referenceCell | INTEGER (1..7) |
| } | |
| SCellListOfTAG ::= | SEQUENCE (SIZE (1..7)) OF Serv-index |

Referring to Table 1, the RRC connection reconfiguration message includes TAG configuration information 'TAG-ConfigDedicated'. A representative serving cell index 'ref-erenceCell' in the sTAG has any one of values 1 to 7 and corresponds to a serving cell index. The serving cell list information 'SCellListOfTAG' of the TAG has any one of values 1 to 7 and corresponds to a serving cell index.

Table 2 shows another example of the RRC connection reconfiguration message including the TAG configuration information.

TABLE 2

| TAG-ConfigDedicated ::= | SEQUENCE { |
| pTAG | BIT STRING (SIZE (7)), |
| sTAG | BIT STRING (SIZE (7)), |
| sTAG-referenceCell | INTEGER (1..7) |
| } | |

Referring to Table 2, the RRC connection reconfiguration message includes TAG configuration information 'TAG-ConfigDedicated'. Unlike in Table 1, in Table 2, serving cells included in a pTAG and an sTAG are represented by bit strings. The bit string has 7 bits, and one serving cell corresponds to only one bit of the bit string. However, the size of the bit string is not limited to 7 bits, and the bit string may have bits less or more than 7 bits.

For another example, a BS may transmit TAG configuration information to a UE using an MAC message.

Figure 17:
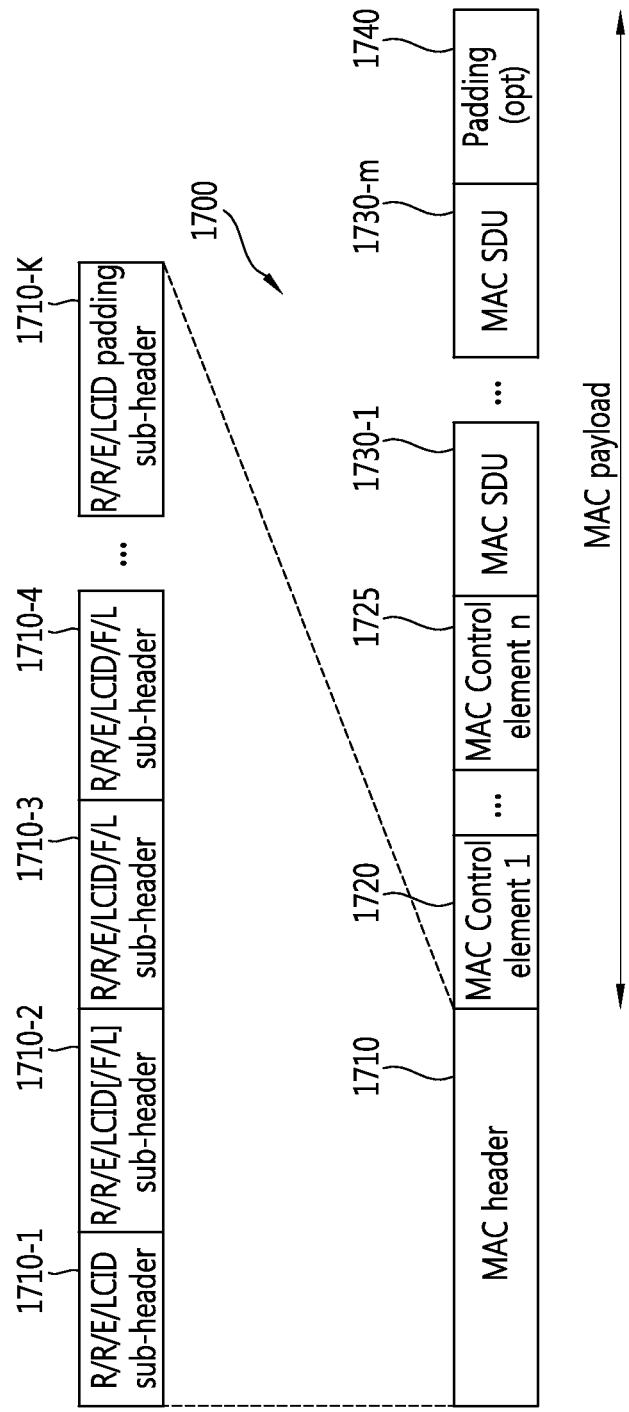
FIG. 17 shows a Medium Access Control Protocol Data Unit (MAC PDU) format to which the present invention is applied.

The MAC message including the TAG configuration information may have an MAC PDU format shown in FIG. 17. In particular, the TAG configuration information may be included in an MAC CE, and the value of an LCID field indicating the MAC CE may be defined as in Table 3.

TABLE 3

| LCID Index | LCID Value |
| --- | --- |
| 00000 | CCCH |
| 00001-01010 | Identifier of a logical channel |
| 01011-11001 | Reserved |
| 11010 | TAG configuration information |
| 11011 | Activation/deactivation |
| 11100 | UE contention resolution identifier |
| 11101 | TAC |
| 11110 | DRX order |
| 11111 | Padding |

Referring to Table 3, the LCID field having a value '11010' indicates that a relevant MAC CE is an MAC CE including TAG configuration information (i.e., an MAC CE for a TAG). A MAC sub-header corresponding to the MAC CE for a TAG includes 6 fields; R/R/E/LCID/F/L. Here, the MAC CE for a TAG may have a variable length. The L field indicates the length of the MAC CE for a TAG in bytes. Furthermore, the length of the L field is indicated by the F field. For example, if the F field is 1 bit and '1', it means that the MAC CE for a TAG is smaller than 128 bytes. In this case, an MAC sub-header is the same as that described in Embodiment 1 of FIG. 9. Furthermore, if the F field is '0', it indicates that the length of the MAC CE for a TAG is 128 bytes or more. In this case, an MAC sub-header is the same as that described in Embodiment 2 of FIG. 9.

Figure 10:
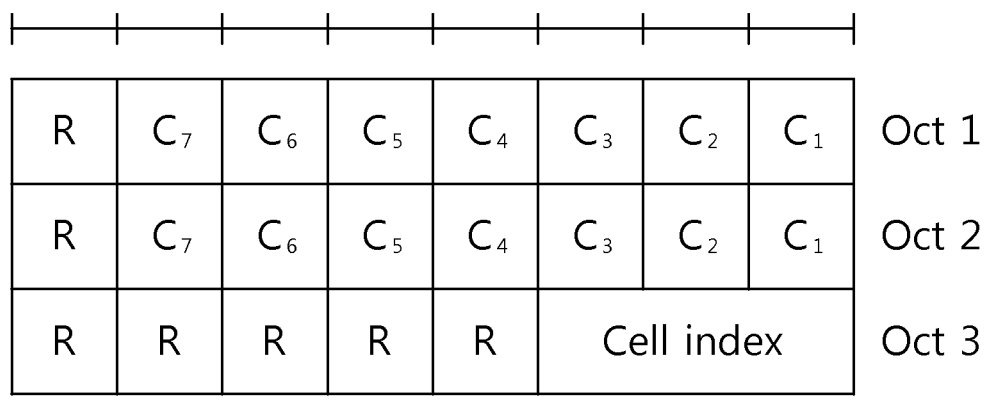
FIG. 10 is a diagram showing an MAC CE for a TAG according to an example of the present invention.

FIG. 10 is a diagram showing an MAC CE for a TAG according to an example of the present invention.

Referring to FIG. 10, an octet 1 (Oct 1) having 8 bits is a region corresponding to a pTAG, and it represents a serving cell included in the pTAG in a bitmap form or a binary form. R, C7, C6, C5, C4, C3, C2, and C1 within the octet 1 sequentially correspond to a serving cell index1, a serving cell index2, . . . , a serving cell index7 from the right, and R is a reserved field. That is, $C_n$ corresponds to a serving cell index n. For example, if $C_n=1$, it may indicate that a serving cell having an index n is included in a pTAG. If $C_n=0$, it may indicate that a serving cell having an index n is not included in a pTAG. In the pTAG, a PSC always becomes a representative serving cell.

The octet 2 (Oct 2) is a region corresponding to a first sTAG, and it represents a serving cell, including in a sTAG, in a bitmap form or a binary form. R, C7, C6, C5, C4, C3, C2, and C1 within the octet 2 sequentially correspond to a serving cell index1, a serving cell index2, . . . , a serving cell index7 from the right, and R is a reserved field. A next octet 3 (Oct 3) indicates a representative serving cell in the sTAG which is indicated by the octet 2, that is, an octet right before the octet 3. That is, the octet 3 includes a cell index field that indicates the representative serving cell of the first sTAG. Since 7 serving cells can be represented by 3 bits, the cell index field has 3 bits, and the remaining five bits of the octet 3 are set for reserved fields R.

Likewise, an octet 2(N−1) is a region corresponding to an $N^{th}$ sTAG, and an octet 2N−1 is a region indicating a representative serving cell in the $N^{th}$ sTAG.

The R field has been illustrated as being placed in the left most bit in each octet, but this is only illustrative. The R field may be placed in the right most bit in each octet.

Figure 11:
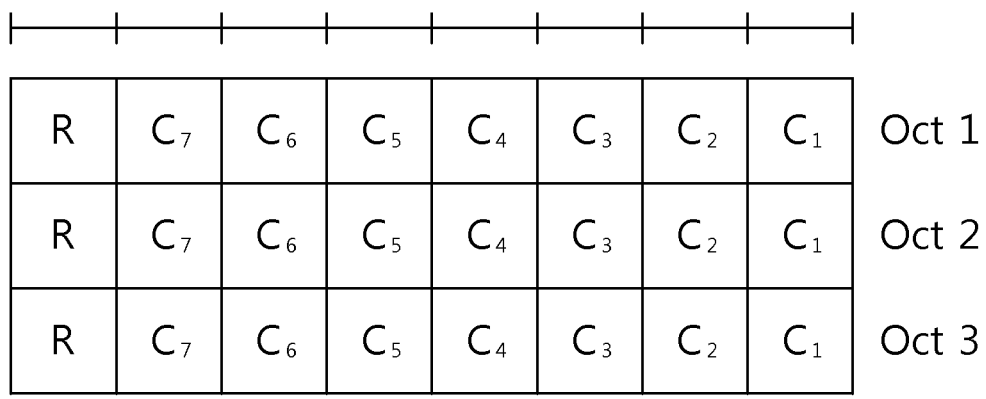
FIG. 11 is a diagram showing an MAC CE for a TAG according to another example of the present invention.

FIG. 11 is a diagram showing an MAC CE for a TAG according to another example of the present invention.

Referring to FIG. 11, octets 1, 2, 3, . . . , n+1 are respective regions sequentially corresponding a pTAG, an sTAG1, an sTAG2, . . . , sTAGn and represent serving cells included in a TAG in a bitmap form or a binary form. The MAC CE of FIG. 11 differs from that of FIG. 10 in that a cell index field indicating the representative serving cell of each TAG does not exist. The representative serving cell of each TAG may be previously defined between a UE and a BS or may be informed by a UE through additional signaling. The R field has been illustrated as being placed in the left most bit in each octet, but this is only illustrative. The R field may be placed in the right most bit in each octet.

In FIG. 5 to FIG. 8, the uplink synchronization is not always performed in association with TAG configuration procedure, can be performed independently of the TAG configuration procedure. In addition, a random access procedure is disclosed for uplink timing synchronization as an exemplary purpose. The transmission and reception of a MAC message can alternatively be used for the uplink synchronization regardless of the random access procedure.

As an example of the present invention, the method of transmitting and receiving TAG Index (or TAG ID) and TAC is disclosed hereinafter in association with the random access procedure. The random access procedure may be performed in a non-contention-based or contention-based manner. The random access procedure has a different procedure according to whether it is performed in a non-contention-based or contention-based manner, and thus the drawings are changed as follows. A procedure of FIG. 12 is applied in case of non-contention and a procedure of FIG. 16 in case of contention.

Figure 12:
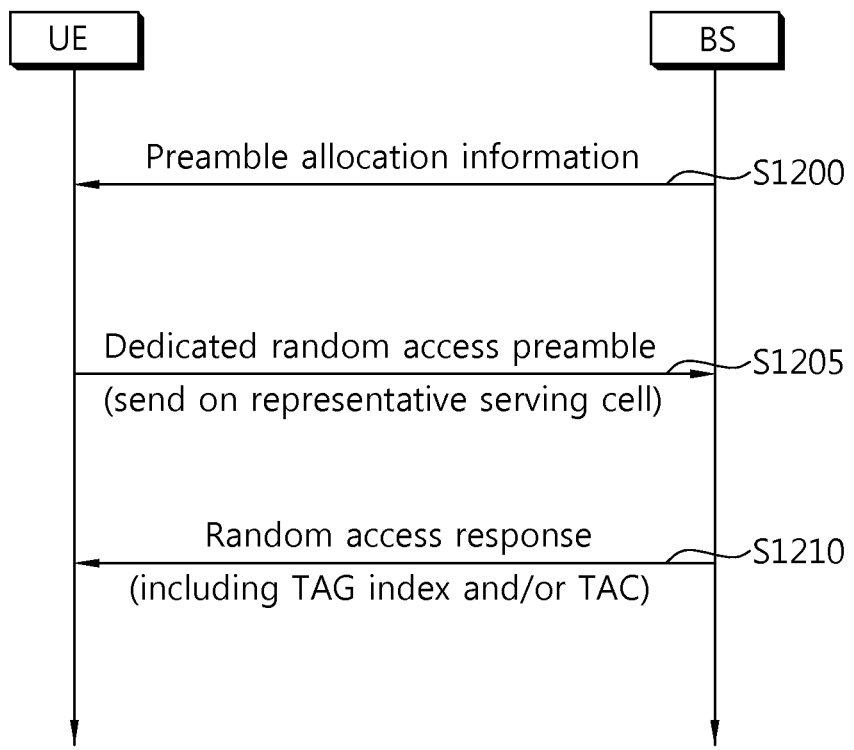
FIG. 12 is a flowchart illustrating for reception of Timing Alignment Command (TAC) according to an example of the present invention.

FIG. 12 is a flowchart illustrating for reception of Timing Alignment Command (TAC) using a random access procedure according to an example of the present invention, which shows a non-contention-based random access procedure.

Referring to FIG. 12, a BS selects one of reserved and dedicated random access preambles for a non-contention-based random access procedure, from among all available random access preambles, and transmits preamble allocation information (i.e., RA preamble assignment), including the index of the selected random access preamble and available time/frequency resources information, to a UE at step S1200. The UE needs to receive a dedicated random access preamble without a collision possibility from the BS for the non-contention-based random access procedure.

For example, if a random access procedure is performed during a handover process, a UE may obtain a dedicated random access preamble from a handover command message. For another example, if a random access procedure is performed at the request of a BS, a UE may obtain a dedicated random access preamble through a PDCCH, that is, physical layer signaling. In this case, the physical layer signaling is a downlink Control Information (DCI) format 1A, and it may include fields, such as those listed in Table 4.

TABLE 4

Carrier Indicator Field (CIF): CIF - or 3 bits.
Flag for identifying formats 0/1A - 1 bit (indicating the format 0 in case of 0 and the format 1A in case of 1)
If format 1A CRC is scrambled by C-RNTI and the remaining fields are set as follows, the format 1A is used for a random access procedure initiated by a PDCCH order.
Below -
Localized/distributed VRB allocation flag - 1 bit and set to 0
Resource block allocation - $\lceil \log_2(N_{RB}^{DL}(N_{RB}^{DL} + 1)/2) \rceil$ bits.
All bits are set to 1
Preamble index - 6 bits
PRACH mask index (mask index) - 4 bits
All the remaining bits of the format 1A for simple scheduling allocation of a PDSCH codeword are set to 0

Referring to Table 4, the preamble index indicates one preamble selected from dedicated random access preambles previously reserved for a non-contention-based random access procedure. The PRACH mask index is available time/frequency resource information. The available time/frequency resource information indicates different resources according to a Frequency Division Duplex (FDD) system and a Time Division Duplex (TDD) system as in Table 5.

TABLE 5

| PRACH Mask Index | Permitted PRACH (FDD) | Permitted PRACH (TDD) |
|---|---|---|
| 0 | All | All |
| 1 | PRACH resource index 0 | PRACH resource index 0 |
| 2 | PRACH resource index 1 | PRACH resource index 1 |
| 3 | PRACH resource index 2 | PRACH resource index 2 |
| 4 | PRACH resource index 3 | PRACH resource index 3 |
| 5 | PRACH resource index 4 | PRACH resource index 4 |
| 6 | PRACH resource index 5 | PRACH resource index 5 |
| 7 | PRACH resource index 6 | Reserved |
| 8 | PRACH resource index 7 | Reserved |
| 9 | PRACH resource index 8 | Reserved |
| 10 | PRACH resource index 9 | Reserved |
| 11 | All even-numbered PRACH opportunities within time domain, First PRACH resource index within subframe | All even-numbered PRACH opportunities within time domain, First PRACH resource index within subframe |
| 12 | All odd-numbered PRACH opportunities within time domain, First PRACH resource index within subframe | All odd-numbered PRACH opportunities within time domain, First PRACH resource index within subframe |
| 13 | Reserved | First PRACH resource index within subframe |
| 14 | Reserved | Second PRACH resource index within subframe |

TABLE 5-continued

| PRACH Mask Index | Permitted PRACH (FDD) | Permitted PRACH (TDD) |
|---|---|---|
| 15 | Reserved | Third PRACH resource index within subframe |

The UE transmits the allocated dedicated random access preamble to the BS through a representative serving cell at step S1205. The representative serving cell is a serving cell which has been selected to transmit the random access preamble in a TAG configured in the UE.

The representative serving cell may be selected for each TAG. Furthermore, the UE may transmit the random access preamble on a representative serving cell within any one TAG, from among a plurality of TAGs, or may transmit the random access preamble on representative serving cells within two or more respective TAGs. For example, it is assumed that TAGs configured in a UE include a TAG1 and a TAG2, TAG1={a first serving cell, a second serving cell, a third serving cell}, and TAG2={a fourth serving cell, a fifth serving cell}. If the representative serving cell of the TAG1 is the second serving cell and the representative serving cell of the TAG2 is the fifth serving cell, the UE transmits the allocated dedicated random access preamble to a BS through the second serving cell or the fifth serving cell.

The random access preamble may be performed after the representative serving cell is activated. Furthermore, a random access procedure for an SSC may be initiated by a PDCCH order transmitted by a BS. In the present embodiment, a non-contention-based random access procedure is described as an example, but the present embodiment may also be applied to a contention-based random access procedure according to an intention of a BS.

If only a TAV for a TAG including a representative serving cell is obtained, a UE may use the obtained TAV as the TAV of all other serving cells included in the TAG. This is because the same TAV is applied to serving cells belonging to the same TAG. As described above, the redundancy, complexity, and overhead of a random access procedure can be reduced by precluding an unnecessary random access procedure in a specific serving cell.

The BS transmits a random access response message to the UE at step S1210. For example, the random access response message may include a TAC. Here, the random access response message can be transmitted in form of MAC RAR as an example, and this is data element configured in a MAC PDU for random access. In accordance with the present invention, the MAC RAR can be transmitted by including TAC, in other word, TAV for adjusting uplink synchronization for a UE.

A TAC field indicates a change of relative uplink timing for the current uplink timing, and it is a multiple of an integer of a sampling time $T_s$, for example, $16T_s$.

In addition, The BS may transmit the Timing Alignment Command (TAC) field to the UE without using the random access response message at step S1210. The Timing Alignment Command (TAC) can be transmitted with index information for a TAG to which a TAV is applied. The TAC indicates a TAV which equally or identically adjusts uplink timing of all serving cells in a TAG. The TAV can be given as a specific index. For another example, a random access response message includes the index of a TAG having a representative serving cell and a TAC for the TAG.

The UE checks or identifies a TAC and/or a TAG index and adjusts the uplink timing regarding all the serving cells within the checked TAG by a TAV according to the TAC. An example of the uplink timing adjusted according to the TAV is shown in Equation 1 to Equation 4. If TACs and/or TAG indices for a plurality of TAGs exist within the random access response message, the UE adjusts the uplink timing regarding a serving cell(s) for each TAG by a TAV according to the relevant TAC. Herein the UE may also determine a TAC and/or a TAG index within the random access response message.

A BS may check that what UE has sent a random access preamble through what serving cell based on a received random access preamble and time/frequency resources. Accordingly, the BS transmits a random access response message to a UE through a Physical Downlink Shared Channel (PDSCH) indicated by a PDCCH which has been scrambled into a Cell-Radio Network Temporary Identifier (C-RNTI) of a UE.

Here, the C-RNTI is an identifier which is allocated to each UE by a BS in order for the UE to check RRC connection set up with the BS and to check scheduling information transmitted by the BS. A BS must allocate a different C-RNTI value to each user within each BS. A temporary C-RNTI is allocated to a UE through a random access response during a contention-based random access procedure performed for RRC connection. When the relevant random access procedure is finally successful, the UE recognizes the temporary C-RNTI as a C-RNTI. A PDCCH indicating a PDSCH to which a random access response message has been mapped may be transmitted through a representative serving cell itself or a scheduling cell for a representative serving cell. Furthermore, if a random access response message is transmitted as an MAC Control Element (CE) for a TAC, that is, if a random access response message is transmitted as a MAC RAR consisting of contents including a TAV (6 bits or 11 bits) and TAG ID information, a PDCCH order and the random access response message may be received through another serving cell not an SSC including UL in which the random access preamble has been transmitted. That is, the random access response may be transmitted without being limited to scheduling for a specific serving cell.

Downlink Control Information (DCI) within a PDCCH on which physical layer (L1) information, indicating that an indicator (i.e., a PDCCH order) indicating the random access procedure and a random access response message, that is, an MAC layer message have been allocated to what radio resources, is transmitted may be transmitted through a lower layer control channel defined as an Extended PDCCH (EPDCCH). The EPDCCH consists of a Resource Block (RB) pair. Here, the RB pair is defined as RBs for two slots, respectively, which form one subframe. If each RB is formed of a pair, the RB may be called a pair. Here, the RBs forming the RB pair may not be formed of slots having the same time. Furthermore, the RBs forming the RB pair may be formed of RBs existing in the same frequency band or may be formed of RBs existing in different frequency bands. This is described with reference to FIGS. 13 to 15.

Figure 13:
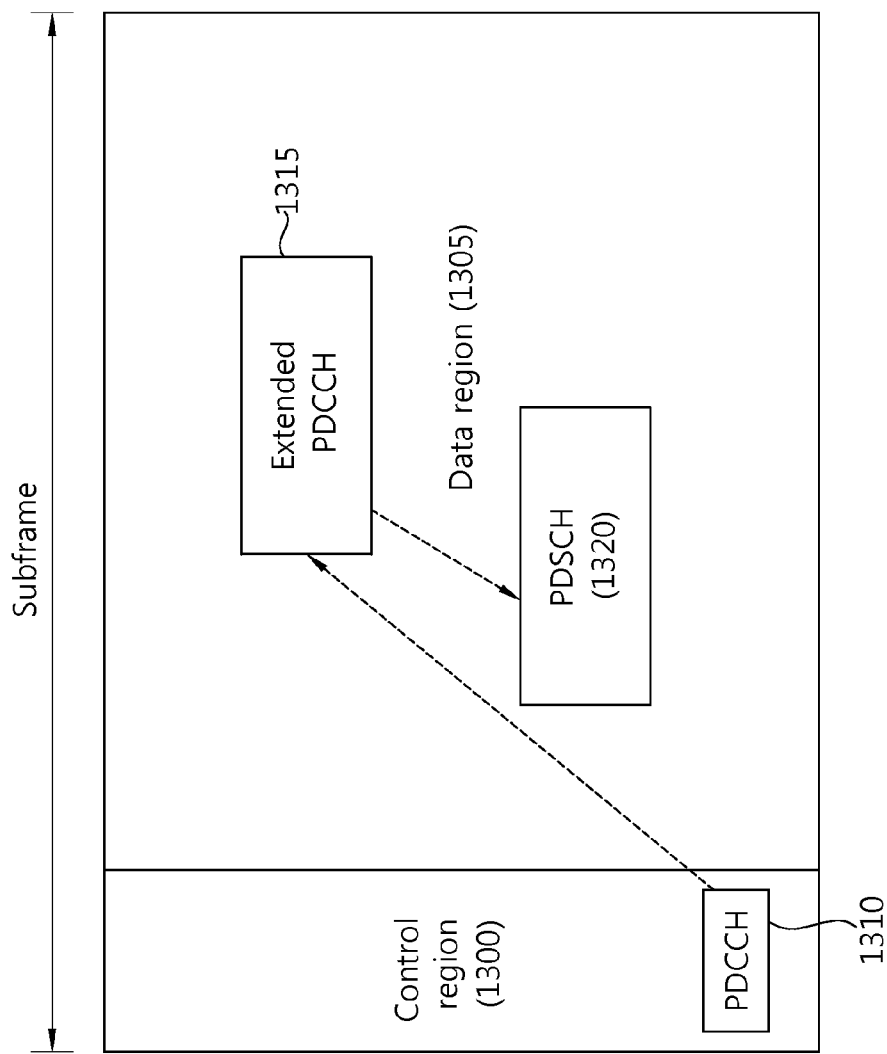
FIG. 13 shows an example in which DCI is mapped to an EPDCCH according to the present invention.

FIG. 13 shows an example in which DCI is mapped to an EPDCCH according to the present invention.

Referring to FIG. 13, a downlink subframe includes a control region 1300 and a data region 1305. A PDCCH 1310 is mapped to the control region 1300, and the downlink subframe has a length of two to four OFDM symbols in the time domain. An Extended PDCCH (EPDCCH) 1315 and a PDSCH 1320 are mapped to the data region 1305. An indication relation between downlink physical channels is described below. The PDCCH 1310 indicates the transmission of the EPDCCH 1315, and the EPDCCH 1315 indicates the PDSCH 1320 including user information that is actually transmitted. The EPDCCH 1315 and the PDCCH 1310 may be mapped to different DL CCs and may be subject to cross-carrier scheduling by the PDCCH 1310. However, the EPDCCH 1315 and the PDSCH 1320 exist in the same DL CC. The EPDCCH 1315 may transmit a PDCCH order and DCI about physical layer (L1) information of a random access response message.

Figure 14:
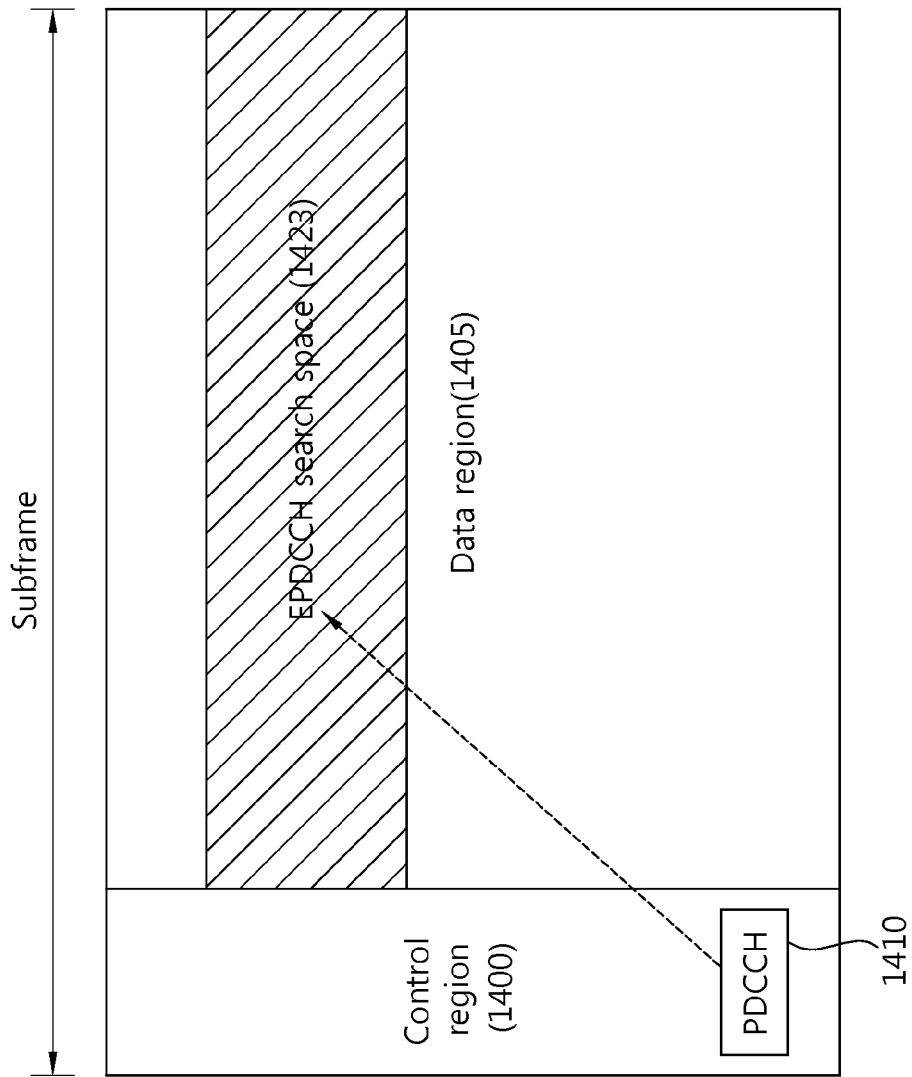
FIG. 14 shows another example in which DCI is mapped to an Extended PDCCH according to the present invention.

FIG. 14 shows another example in which DCI is mapped to an Extended PDCCH according to the present invention.

Referring to FIG. 14, a PDCCH 1410 mapped to a control region 1400 indicates an EPDCCH search space 1423 mapped to a data region 1405. A UE has to detect the EPDCCH within the EPDCCH search space 1423 by using a blind decoding method used to receive the PDCCH 1410, that is, a data detection method based on a Cyclic Redundancy Check (CRC) method. Furthermore, the EPDCCH 1423 and the PDCCH 1410 may be mapped to different DL CCs and may be subject to cross-carrier scheduling by the PDCCH 1410. The EPDCCH 1423 includes a PDCCH order and physical layer (L1) information about a random access response message.

Figure 15:
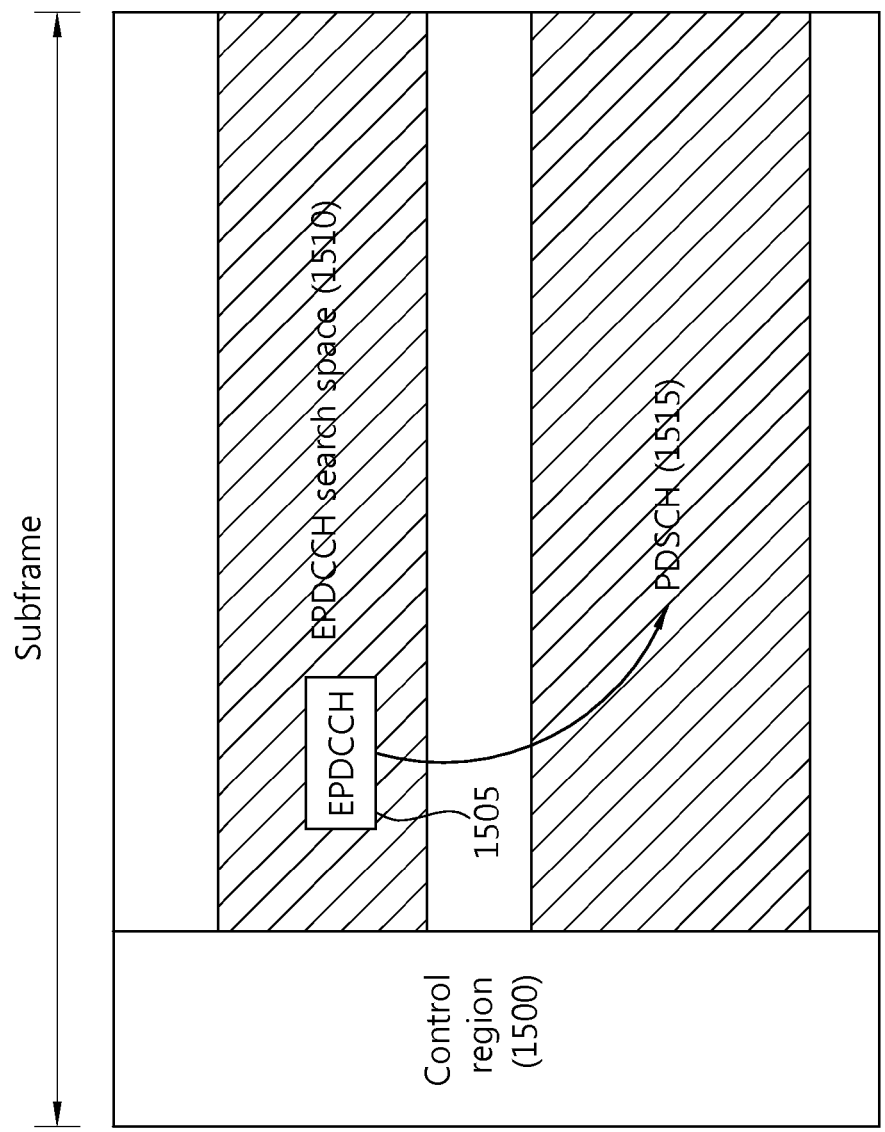
FIG. 15 shows yet another example in which DCI is mapped to an extended physical downlink control channel according to the present invention.

FIG. 15 shows yet another example in which DCI is mapped to an extended physical downlink control channel according to the present invention.

Referring to FIG. 15, an EPDCCH 1505 exists in an EPDCCH search space 1510 irrespective of a PDCCH. Information about the EPDCCH search space 1510 provides information about a different search space (e.g., search space bandwidth information) to each UE through higher layer RRC or provides information about a search space, shared by a plurality of UEs, through RRC signaling or a broadcasting method. Here, a control region 1500 may do not exist, that is, may be removed.

In this case, a UE must perform blind decoding for the EPDCCH search space 1510 in order to obtain the EPDCCH 1505. If the EPDCCH search space 1510 is 1, that is, the EPDCCH search space 1510 has been defined as a space to which only one EPDCCH may be mapped, a method of determining whether its own EPDCCH may be received according to a data detection method using C-RNTI allocated to each UE may be used. Furthermore, the EPDCCH 1505 and a PDSCH 1515 exist in the same DL CC.

Whether a UE will receive the EPDCCH 1505 or a PDCCH from a relevant serving cell is determined by a BS. This may be configured for each serving cell through higher layer RRC signaling.

If a UE has been configured to receive the EPDCCHs 1315, 1423, and 1505 from a specific serving cell, the UE does not receive a PDCCH which is transmitted in a UE-specific manner. Accordingly, the UE may receive a random access initiation indicator, including preamble allocation information, through only the EPDCCHs 1315, 1423, and 1505 in a random access procedure which is performed in the specific serving cell. Furthermore, the UE may receive random access response information within PDSCHs 1320, 1405, and 1515 which are indicated by the respective EPDCCHs 1315, 1423, and 1505. Therefore, the UE may also determine a TAC and/or a TAG index in the random access response message within PDSCHs 1320, 1405, and 1515 which are indicated by the respective EPDCCHs in the present embodiments.

Referring back to FIG. 12, according to the non-contention-based random access procedure, by receiving the random access response message, the UE determines that the random access procedure has been normally performed, and thus terminates the random access procedure. If a preamble index within preamble allocation information received by a UE is '000000', the UE randomly selects one of contention-based random access preambles, also sets a PRACH mask index value to '0', and then performs a contention-based procedure. Furthermore, preamble allocation information may be transmitted to a UE through the message (e.g., Mobility Control Information (MCI) within a handover command) of a higher layer, such as RRC.

Figure 16:
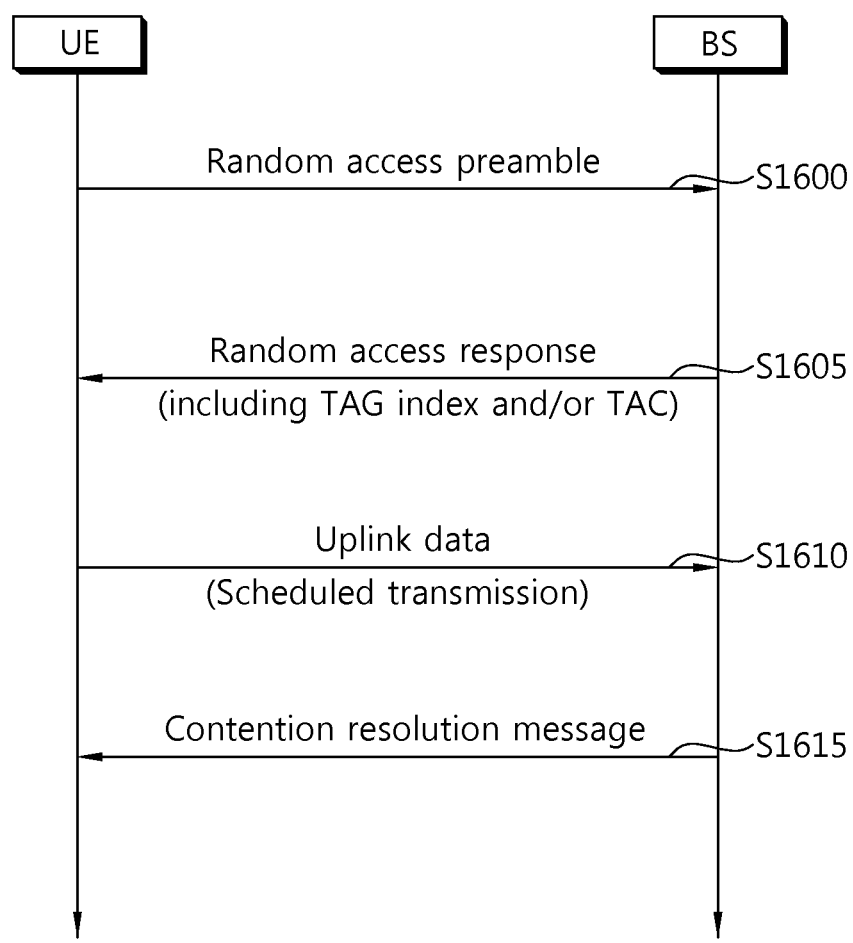
FIG. 16 is a flowchart illustrating for reception of Timing Alignment Command (TAC) according to another example of the present invention.

FIG. 16 is a flowchart illustrating for reception of Timing Alignment Command (TAC) using a random access procedure according to another example of the present invention. This corresponds to a contention-based random access procedure. A UE requires uplink synchronization in order to transmit and receive data to and from a BS. The UE may perform a process of receiving information necessary for synchronization from the BS for the uplink synchronization. A random access procedure may also be applied to the case where a UE is newly combined with a network for handover, etc. After the UE is combined with the network, various situations, such as a change of the state of synchronization or RRC from RRC IDLE to RRC_CONNECTED, may be performed.

Referring to FIG. 16, a UE randomly selects one preamble signature from a set of random access preamble signatures and transmits a random access preamble according to the selected preamble signature to a BS through a representative serving cell by using PRACH resources at step S1600. The representative serving cell is a serving cell selected to transmit the random access preamble, from a TAG configured in the UE.

The meaning that the random access preamble has been transmitted may mean that pieces of configuration information for transmitting a preamble have been received in the random access procedure from all serving cells within a relevant TAG and may mean that a random access procedure has been instructed through a PDCCH order from among a plurality of serving cells within a TAG in which a random access procedure is possible. Furthermore, the representative serving cell may be a serving cell including a timing reference DL CC which is a criterion in order to apply a TAV that is subsequently received through a random access response.

The representative serving cell may be selected for each TAG. Furthermore, the UE may transmit a random access preamble on a representative serving cell within any one TAG, from among a plurality of TAGs, or may transmit a random access preamble on representative serving cells within two or more TAGs, respectively.

The random access procedure may be performed after the representative serving cell is activated. Furthermore, a random access procedure for an SSC may be initiated by a PDCCH order which is transmitted by the BS.

Information about a set of random access preambles may be obtained from some of system information or from a BS through a handover command message. Here, the UE may know a Random Access-Radio Network Temporary Identifier (RA-RNTI) by taking frequency resources, temporarily selected in order to select a preamble or transmit an RACH, and a transmission time into consideration.

In response to the random access preamble of the UE, the BS transmits a random access response message to the UE at step S1605. A channel used at this time is a PDSCH. The random access response message may be transmitted in the form of a MAC RAR. The random access response message includes a TAC for the uplink synchronization of the UE, UL radio resource allocation information, a Random Access Preamble IDentifier (RAPID) for identifying UEs each of which performs a random access procedure, information about a time slot on which the random access preamble of the UE has been received, and the temporary identifier of the UE, such as a temporary C-RNTI. The random access preamble identifier is used to identify a received random access preamble.

Herein, The BS may transmit the Timing Alignment Command (TAC) field to the UE without using the random access response message at step S1610. The Timing Alignment Command (TAC) can be transmitted with index information for a TAG to which a TAV is applied. The TAC field indicates the TAV which equally or identically adjusts uplink timing of all serving cells in a TAG. The TAV can be given as a specific index. For another example, a random access response message includes the index of a TAG having a representative serving cell and a TAC for the TAG.

The UE transmits uplink data, including the random access identifier, to the BS through a PUSCH at the time of scheduling which is determined based on a TAV according to a TAC at step S1610. Here the UE may check/identify a TAC and/or a TAG index and adjust the uplink timing regarding all the serving cells within the checked TAG using the TAV according to the TAC field, before transmitting the uplink data. An example of the uplink timing adjusted according to the TAV is shown in Equation 1 to Equation 4. If TACs and/or TAG indices for a plurality of TAGs exist within the random access response message, the UE adjusts the uplink timing regarding a serving cell(s) for each TAG by a TAV according to the relevant TAC field. Of course, the UE may also determine a TAC and/or a TAG index within the random access response message.

The uplink data may include an RRC connection request, tracking area update, a scheduling request, or buffer status reporting on data that will be transmitted by the UE in UL. The random access identifier may include a temporary C-RNTI, a C-RNTI (i.e., the state included in the UE), or UE identifier information (i.e., UE contention resolution identifier). When the TAV is applied, the UE starts or restarts a TAT. If the TAT is previously operated, the UE restarts the TAT. If the TAT is not previously operated, the UE starts the TAT.

The BS transmits a contention resolution message, informing that the random access has been successfully finished, to the UE because random access preambles transmitted by several UEs may collide against each other in the processes S1600 to S1610 at step S1615. The contention resolution message may include a random access identifier. In a contention-based random access procedure, contention is generated because the number of possible random access preambles is limited. Since unique random access preambles cannot be assigned to all UEs within a cell, each UE randomly selects one random access preamble from a set of random access preambles and transmits the selected random access preamble. Accordingly, two or more UEs may select and transmit the same random access preamble through the same PRACH resources.

At this time, the transmission of uplink data all fails, or a BS successfully receives only uplink data from a specific UE according to the position or transmit power of each of the UEs. If the BS successfully receives uplink data, the BS transmits a contention resolution message by using a random access identifier including the uplink data. A UE which has received its own random access identifier may know that contention resolution is successful. In a contention-based random access procedure, what a UE knows the failure or success of contention is called contention resolution.

When the contention resolution message is received, the UE checks whether the contention resolution message is for the UE. If, as a result of the check, the contention resolution message is for the UE, the UE transmits ACK to the BS. If, as a result of the check, the contention resolution message is for another UE, the UE does not transmit response data. Even when downlink allocation is missed or a message is not decoded, the UE does not transmit response data. Furthermore, the contention resolution message may include a C-RNTI, UE identifier information, etc.

As another example of the present invention, the method of transmitting and receiving TAG Index (or TAG ID) and TAC is disclosed hereinafter in association with a MAC layer signaling. The UE can obtain the TAV for uplink synchronization by means of MAC layer signaling regardless of the random access procedure. In the case of MAC layer signaling, a MAC PDU may include a header including a subheader having a LCID field for indicating that a specific MAC CE includes TAC field, and the specific MAC CE may include the TAC field and TAG index field.

FIG. 17 shows a Medium Access Control Protocol Data Unit (MAC PDU) format to which the present invention is applied.

Referring to FIG. 17, the MAC PDU 1700 includes an MAC header 1710, one or more MAC CEs 1720 to 1725, one or more MAC Service Data Units (SDUs) 1730-1 to 1730-$m$, and padding 1740.

The MAC header 1710 includes one or more sub-headers 1710-1, 1710-2 to 1710-$k$. Each of the sub-headers 1710-1, 1710-2 to 1710-$k$ may correspond to the MAC SDUs 1730-1 to 1730-$m$ or one the MAC CEs 1720 to 1725 or the padding 1740 in a one-to-one manner. The sequence of the sub-headers 1710-1, 1710-2 to 1710-$k$ is the same as the sequence of the MAC SDUs 1730-1 to 1730-$m$, the MAC CEs 1720 to 1725 or the padding 1740 within the MAC PDU 1700.

Each of the sub-headers 1710-1, 1710-2 to 1710-$k$ may include four fields; R, R, E, and LCID or may include six fields; R, R, E, Logical Channel ID (LCID), F, and L. The sub-headers each including the four fields correspond to the MAC CEs 1720 to 1725 or the padding 1740, and the sub-headers including the six fields correspond to the MAC SDU.

A LCID field identifies logical channels corresponding to the MAC SDUs 1730-1 to 1730-$m$ or identifies the type of the MAC CEs 1720 to 1725 or the padding 1740. When each of the sub-headers 1710-1, 1710-2 to 1710-$k$ has an octet structure, the LCID field may have 5 bits.

For example, the LCID field may be used to identify whether the corresponding MAC CE is a MAC CE for indicating the activation/deactivation of a serving cell, contention resolution identity MAC CE for solving contention between UEs, or a MAC CE for a TAC as in Table 6 according to an LCID value. The MAC CE for a TAC is a MAC CE used for timing alignment, and it includes a TAC field.

TABLE 6

| LCID Index | LCID Value |
| --- | --- |
| 00000 | CCCH |
| 00001-01010 | Identifier of a logical channel |
| 01011-11010 | Reserved |
| 11011 | Activation/deactivation |
| 11100 | UE contention resolution identifier |
| 11101 | TAC |

TABLE 6-continued

| LCID Index | LCID Value |
| --- | --- |
| 11110 | DRX order |
| 11111 | Padding |

Referring to Table 6, if an LCID field has a value 11101, an MAC CE corresponding to a sub-header including the LCID field is an MAC CE for a TAC.

Meanwhile, when a TAC is given for a plurality of serving cells because the plurality of serving cells is configured for a UE, an LCID field may be given as in Table 7.

TABLE 7

| LCID index | LCID value |
| --- | --- |
| 00000 | CCCH |
| 00001-01010 | Identifier of a logical channel |
| 01011-11001 | Reserved |
| 11010 | Extended Timing Advance Command (TAC) |
| 11011 | Activation/deactivation |
| 11100 | UE contention resolution identifier |
| 11101 | TAC |
| 11110 | DRX order |
| 11111 | Padding |

Referring to Table 7, if an LCID field has a value 11010, a MAC CE corresponding to a sub-header including the LCID field may be an MAC CE for a TAC for a plurality of serving cell.

The MAC CEs 1720 to 1725 are control messages generated by an MAC layer. The padding 1740 is a specific number of bits which are added to make the size of an MAC PDU constant. The MAC CEs 1720 to 1725, the MAC SDUs 1730-1 to 1730-*m*, and the padding 1740 are also collectively called an MAC payload.

Figure 19:
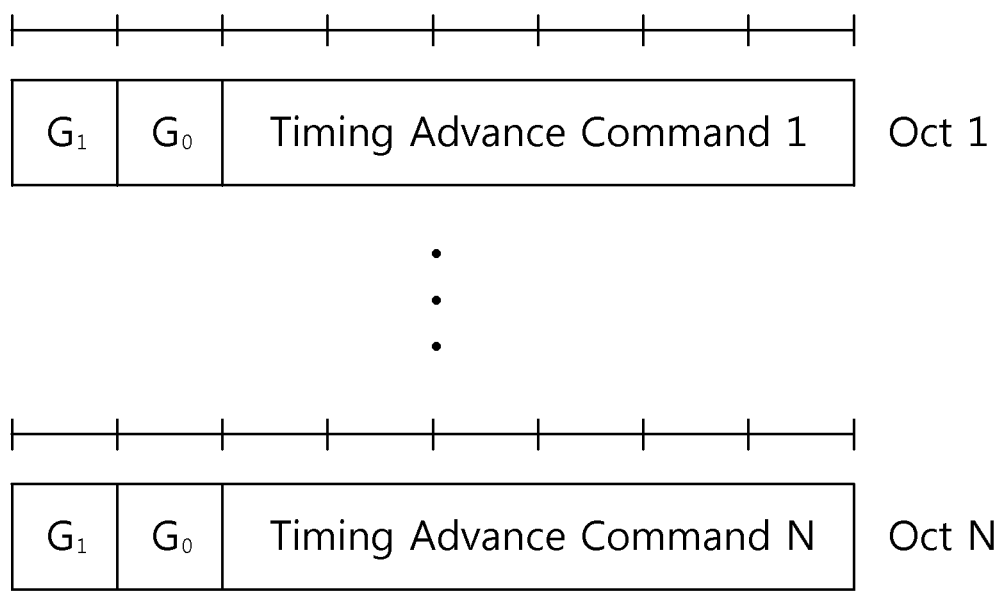
FIG. 19 is a block diagram showing a MAC CE for a TAC according to another example of the present invention.
Figure 20:
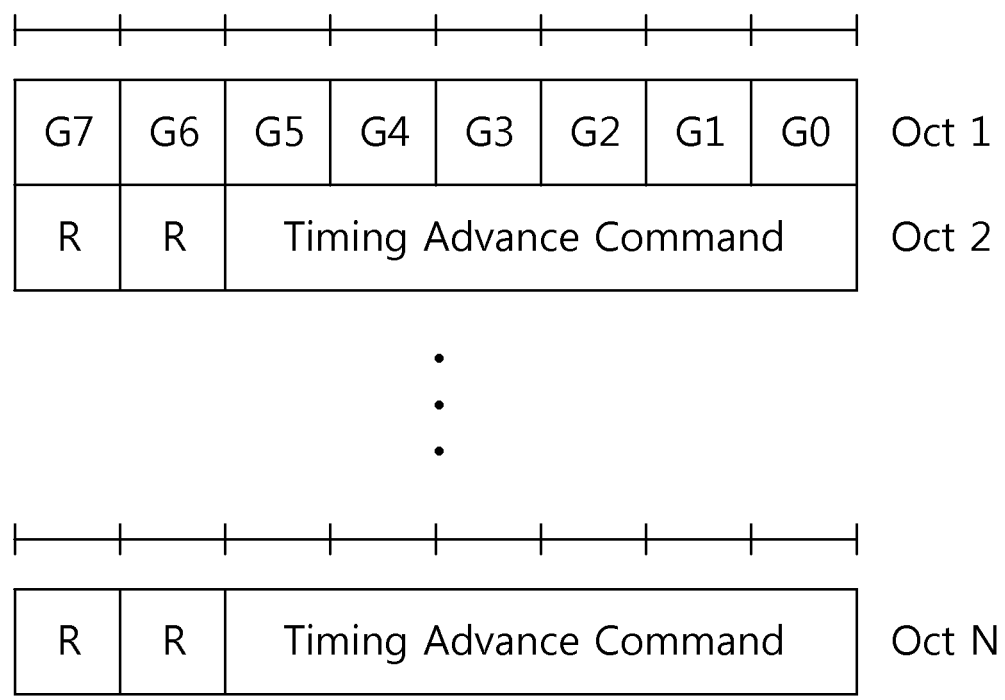
FIG. 20 is a block diagram showing a MAC CE for a TAC according to yet another example of the present invention.

For uplink timing adjustment, a BS transmits the index of a specific TAG and a TAV, applied to the specific TAG in common, to a UE. To this end, an MAC CE for a TAC may be used. Examples of the MAC CE for a TAC are shown in FIG. 18 to FIG. 20.

Figure 18:
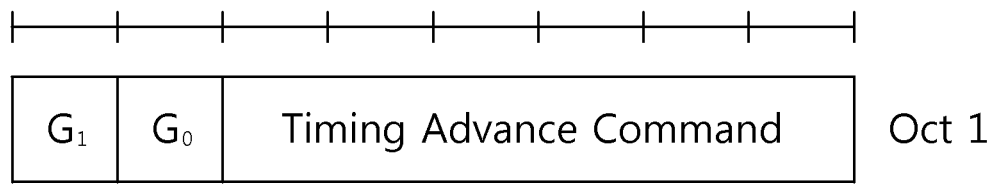
FIG. 18 is a block diagram showing a MAC CE for a Timing Alignment Command (TAC) according to an example of the present invention.

FIG. 18 is a block diagram showing a MAC CE for a Timing Alignment Command (TAC) according to an example of the present invention.

Referring to FIG. 18, the MAC CE for a TAC includes the TAG index fields ($G_1$ and $G_0$) and a TAC field. Here, the index of the TAG may also be called a TAG index or an TAG identifier (ID). The TAC field indicates a TAV. When the MAC CE for a TAC has an octet structure, the TAG index field has 2 bits, and the TAC field has 6 bits. The TAG index is defined in TAG configuration information. For example, the TAG index field ($G_1$, $G_0$) is used 2 bits, so there are 4 TAGs and TAG indices are 0, 1, 2, and 3, $G_1$, $G_0$ may be expressed as one of {00, 01, 10, 11}.

If a maximum number of TAGs are 2, for example, any one of 2 bit-TAG index field such as $G_1$ may be set as a reserved bit R, or a TAG index field may be defined to have only 1 bit and the TAC field may be defined to have 7 bits.

The number of bits of the TAG index field and the number of bits of the TAC field are only illustrative, but are not necessarily limited to 2 and 6, respectively. Furthermore, the TAG index including a PSC may be fixed to '00' or '0'.

FIG. 19 is a block diagram showing a MAC CE for a TAC according to another example of the present invention.

Referring to FIG. 19, the MAC CE for a TAC includes an octet 1 (Oct 1) to an octet N (Oct N). Each octet includes the TAG index fields $G_1$ and $G_0$ and a TAC field.

For example, it is assumed that a UE requires a TAV for a TAG1 and a TAV for a TAG2 for uplink synchronization. A BS includes an MAC CE for a TAC for two octets in an MAC PDU, such as that shown in FIG. 17 (i.e., N=2). Here, the first octet includes the index field of the first TAG, indicating the index of the TAG1, and a first TAC field indicating the TAV of the TAG1. The second octet includes the index field of the second TAG, indicating the index of the TAG2, and a second TAC field indicating the TAV of the TAG2.

In other words, the TAG index fields with 2 bits ($G_1$, $G_0$) in each Octet indicates a group to perform uplink timing adjustment, and the TAC field indicates a TAV for the corresponding group.

A UE can perform the same or adaptive timing alignment according to TAV configured for a plurality of groups by using a single message, that is, a MAC message which includes a multiple group indices and a multiple TAVs for the corresponding multiple groups. When a plurality of TAGs are configured in a UE, a MAC CE indicating TAVs for a plurality of TAGs can be configured.

The UE performs timing alignment by applying the TAV of the TAG1 to all serving cells belonging to the TAG1 and performs timing alignment by applying the TAV of the TAG2 to all serving cells belonging to the TAG2.

FIG. 20 is a block diagram showing a MAC CE for a TAC according to yet another example of the present invention.

Referring to FIG. 20, the MAC CE for a TAC includes an octet 1 (Oct 1) to an octet N (Oct N). The octet 1 includes an indicator for each serving cell (or a CC). The indicator may indicate whether a TAC field regarding a serving cell exists or not. For example, G0 becomes an indicator indicating whether a TAC field for a TAG0, that is, a TAG including a PSC exists or not, G1 becomes an indicator indicating whether a TAC field for a TAG1 exists or not, and G7 becomes an indicator indicating whether a TAC field for a TAG7 exists or not. Accordingly, the G0, G1, and G3 indicating the TAG0, TAG1, and TAG3 are set to 1, and the remaining G2 and G4~G7 are set to 0. Furthermore, TAC values for the TAG0, TAG1, and TAG3 are sequentially mapped. If the structure of FIG. 20 is used, a TAC value may be set for a specific TAG requiring update for the specific TAG. Each of the remaining octet 2 to octet N includes reserved fields R and a TAC field.

Figure 21:
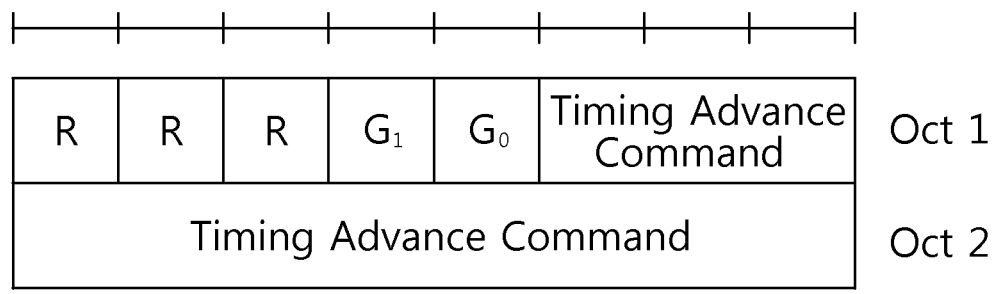
FIGS. 21 and 22 are block diagrams showing MAC CEs for a TAC according to yet another example of the present invention.
Figure 22:
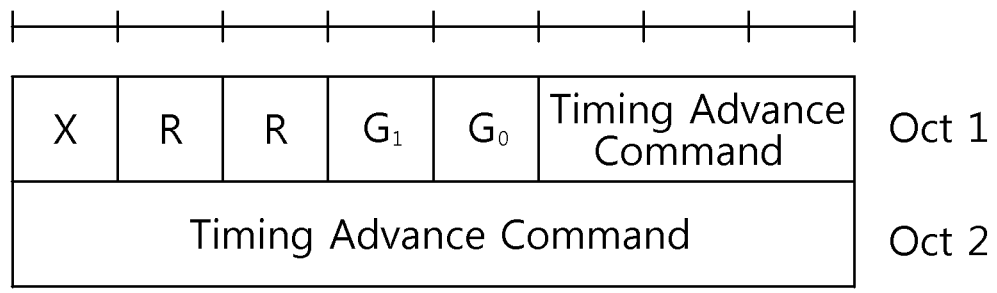

FIGS. 21 and 22 are block diagrams showing MAC RARs for a TAC according to yet another example of the present invention.

Referring to FIG. 21 and FIG. 22, the MAC CE for a TAC includes indices G1 and G0 of TAG fields and a TAC field. If the MAC CE for a TAC has a two-octet structure, reserved bits may be 3 bits, the index of the TAG field may have 2 bits, and the TAC field may have 11 bits. If the index of the TAG field has 1 bit or 3 bits, reserved bits may have 4 bits or 2 bits. Here, as in FIG. 22, one of the reserved bits may be set to a bit(X) not using the most significant bit.

The TAC field with 11 bits is a message format used in a random access procedure, and thus transmitted by being included in a random access response message.

Figure 23:
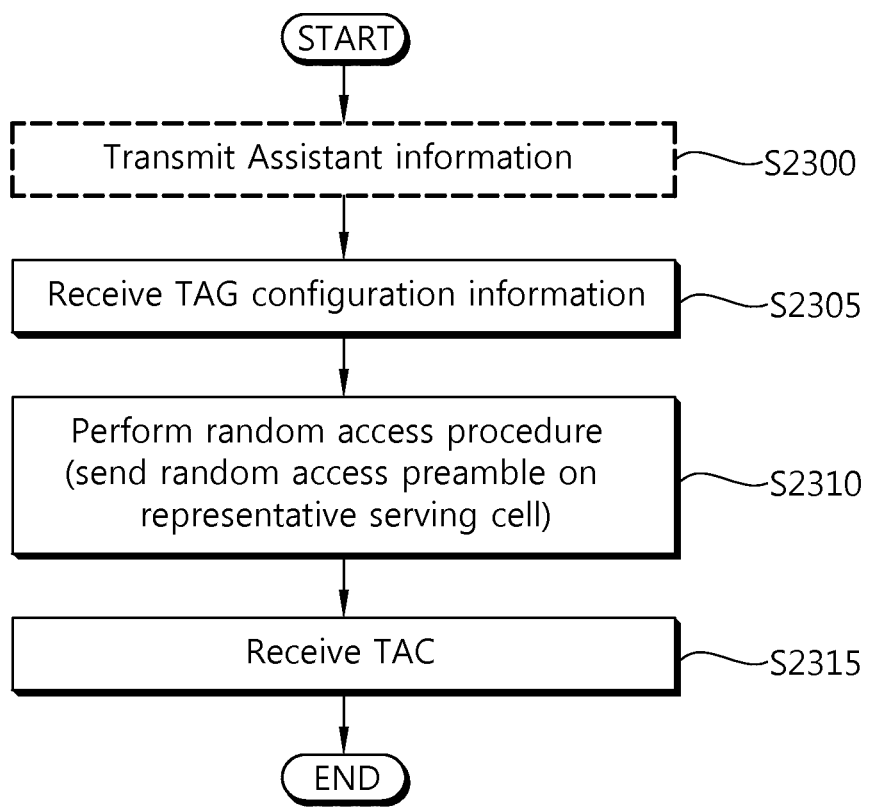
FIG. 23 is a flowchart illustrating the operation of a UE which performs uplink synchronization according to an example of the present invention.

FIG. 23 is a flowchart illustrating the operation of a UE which performs uplink synchronization according to an example of the present invention.

Referring to FIG. 23, the UE transmits assistant information to a BS at step S2300. The assistant information provides information or a criterion necessary to classify one or more serving cells, configured in the UE, into a TAG. Meanwhile, the BS may have known the classifying assistant information separately or may already have owned the classifying assistant information. In this case, the random access procedure according to the present embodiment may be performed without the step S2300.

If a UE in an idle mode cannot aggregate CCs and only a UE in an RRC connected mode can aggregate CCs, the UE in the idle mode may select a cell for RRC connection prior to the aggregation of CCs before the step S2300 and perform an RRC connection establishment procedure for the BS through the selected cell.

The UE receives TAG configuration information from the BS at step S2305. The TAG is a group including at least one serving cell, and the same TAV is applied to serving cells within a TAG. In other words, a single TAV is identically applied to all serving cells in the TAG. For example, the BS may configure the TAT in a UE-specific manner. For another example, the BS may configure the TAG in a cell-specific manner. The TAG configuration information can be received via RRC signaling. Or The TAG configuration information can be received via MAC signaling.

The TAG configuration information describes the state in which the TAG has been configured. For example, the TAG configuration information may include the number field of the TAG, the index field of the TAG, and the index field of each of the serving cells included in the TAG, and the fields describe the state in which the TAG has been configured.

For another example, the TAG configuration information may further include information on a representative serving cell within each TAG. The representative serving cell is a serving cell which may perform a random access procedure for maintaining and setting uplink synchronization within each TAG. Unlike in the above embodiment, if the TAG configuration information does not include a representative serving cell, the UE may independently select a representative serving cell within each TAG.

Next, the UE performs a random access procedure at step S2310. In this step, the UE transmits a random access preamble to the BS and may receive a random access response message, including a TAC field, from the BS. For example, the UE may receive the random access response message in form of a MAC RAR in response to the random access preamble. The MAC RAR includes the TAC field, which indicates a TAV. The UE can also receive index information of a TAG (that is, TAG ID) to perform uplink timing alignment.

Another example, the UE may receive a TAC field from the BS at step S2315 after receiving the random access response message (at step S2310). Also the UE can receive a TAC field from the BS at step S2315 without receiving the random access response message at step S2310.

In more detail, the UE can receive the TAC field via a MAC PDU as described in FIG. 18 to FIG. 20. The MAC PDU includes a header including a subheader which corresponds to a MAC CE, the MAC CE having a TAG index field and the TAC field. Accordingly, the UE can obtain the subheader and the MAC CE including the TAG index for the TAC field from the MAC PDU. That is, the UE obtains the TAG index field and the TAC field from the MAC CE after checking that the LCID index is set to 11101 as LCID value for TAC. The MAC CE may also include TAVs each of which corresponds to each of TAGs respectively.

According to the present invention, the UE checks an index of a LCID field, which is included in the subheader and corresponds to the MAC CE, and the UE identifies that the MAC CE is for a TAC based on the checking. That is, the UE checks whether the LCID field indicates a specific index (i.e. 11101) which represents that the corresponding MAC CE includes the TAC field.

And as a result of the checking, if the MAC CE is for a TAC, the UE determines (or acquires or identify) the TAV indicated by the TAC field in the MAC CE. The UE identifies a TAG by the TAG index field. The UE can identify 4 TAGs defined by 2 bits of the TAG index fields $(G_1, G_0)$. The UE adjusts uplink timing of serving cell(s) in the TAG identically with a TAV indicated by the TAC field. In other words, the UE controls uplink timing regarding at least one serving cell or all serving cells within the identified TAG by the TAV. Accordingly, the UE performs an uplink timing adjustment operation. In an example, if the UE finds that the $(G_1, G_0)$ is set to 00, the UE controls uplink timing of serving cells in a pTAG, which includes PSC, by applying the TAV.

If the MAC CE for a TAC includes TAC fields and/or TAG index fields for multiple TAGs as described in FIG. 19 or FIG. 20, the UE adjusts uplink timing of serving cell(s) in each TAG based on a TAV indicated by each of the TAC fields. An example of the uplink timing adjusted by the TAV is shown in Equation 1 to Equation 4.

Figure 24:
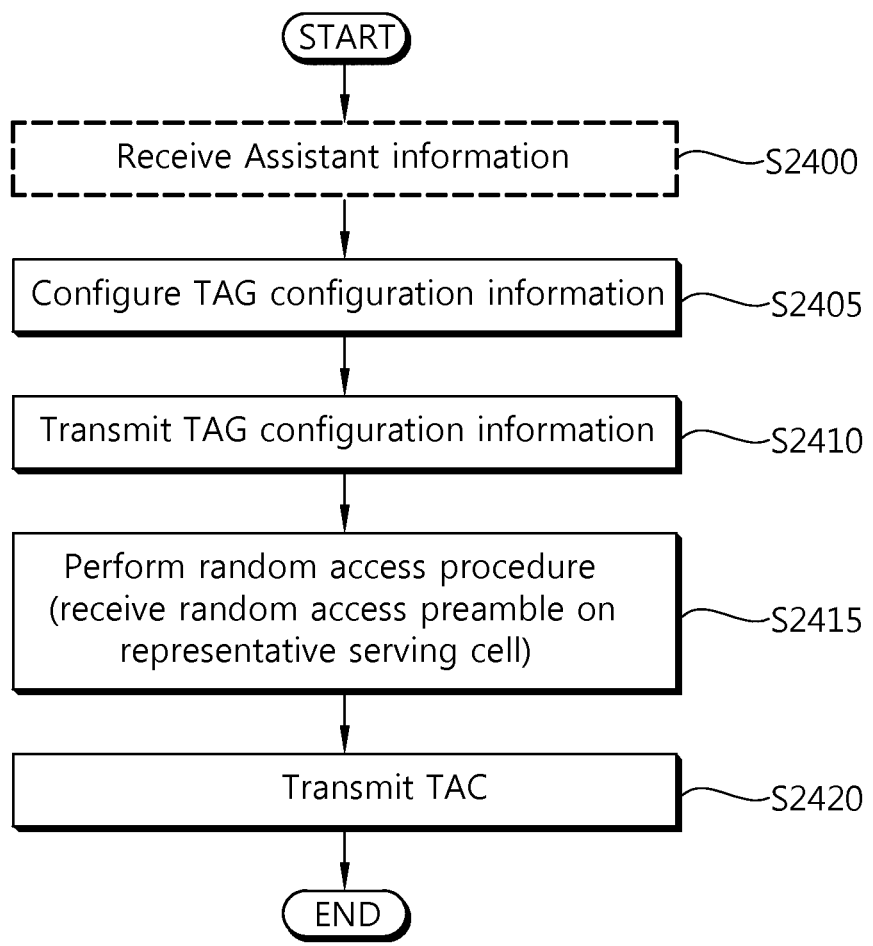
FIG. 24 is a flowchart illustrating the operation of a BS which performs uplink synchronization according to an example of the present invention.

FIG. 24 is a flowchart illustrating the operation of a BS which performs uplink synchronization according to an example of the present invention.

Referring to FIG. 24, the BS receives assistant information from a UE at step S2400. The assistant information provides information or a criterion necessary to classify one or more serving cells, configured in the UE, as a TAG. Meanwhile, the BS may have known the classifying assistant information separately or may already have owned the classifying assistant information. In this case, the random access procedure according to the present embodiment may be performed without the step S2400.

The BS configures the TAG based on the classifying assistant information at step S2405 and transmits TAG configuration information to the UE at step S2410. The TAG is a group including one or more serving cells. The same TAV is applied to serving cell(s) within a TAG. For example, the BS may configure the TAG in a UE-specific manner. For another example, the BS may configure the TAG in a cell-specific manner. The TAG configuration information describes the state in which the TAG has been configured.

Next, the BS may perform a random access procedure at step S2415. In this step, the BS receives a random access preamble from the UE and transmits a random access response message to the UE. The BS may transmit the Timing Alignment Command (TAC) field to the UE without using the random access response message at step S2415. Here, the random access response message is transmitted by including a MAC RAR and a corresponding subheader, wherein the MAC RAR is a data component of the random access response message, and the corresponding subheader includes a random access preamble identifier (RAPID) field. According to the present invention, the BS may include a TAC field in the MAC RAR when transmitted.

Apart from the step S2415, the BS may transmit TAC field to the UE at step S2420. In more detail, the BS may also determine a TAC and/or a TAG index and transmit the TAC and/or a TAG index for the TAC. the BS generates a MAC PDU by including a TAC field as described in FIG. 18 to FIG. 20 in the MAC PDU. The BS transmits the MAC PDU by including a header and a MAC CE, wherein the header includes a subheader which corresponds to a MAC CE and the MAC CE includes a TAG index field and the TAC field. Herein, The BS may set the subheader of LCID value for the TAC to send the MAC PDU for the TAC without the random access response message.

The BS sets the TAG index fields ($G_1$, $G_0$) to indicate 4 TAGs defined by 2 bits. That is, the maximum number of TAGs configurable in the UE is 4 by the TAG index fields ($G_1$, $G_0$) of the length of 2 bits. The BS determines the TAG index field to indicate a certain TAG among the 4 TAGs. And if the BS determines that uplink timing control is required for a pTAG, the BS sets the ($G_1$, $G_0$) to 00. And the BS sets the TAC field to a TAV relevant to all serving cell(s) in the pTAG.

In other words, according to the present invention, the BS generates a MAC CE by including the TAC field and the TAG field in the MAC CE, and generates a header having a subheader with the LCID field, by setting (or configuring) the LCID value to a specific index (i.e. 11101) to indicate that the MAC CE corresponding to the subheader is for a TAC. The BS transmits the MAC PDU including the header and the MAC CE and transmits the generated MAC PDU to the UE.

Figure 25:
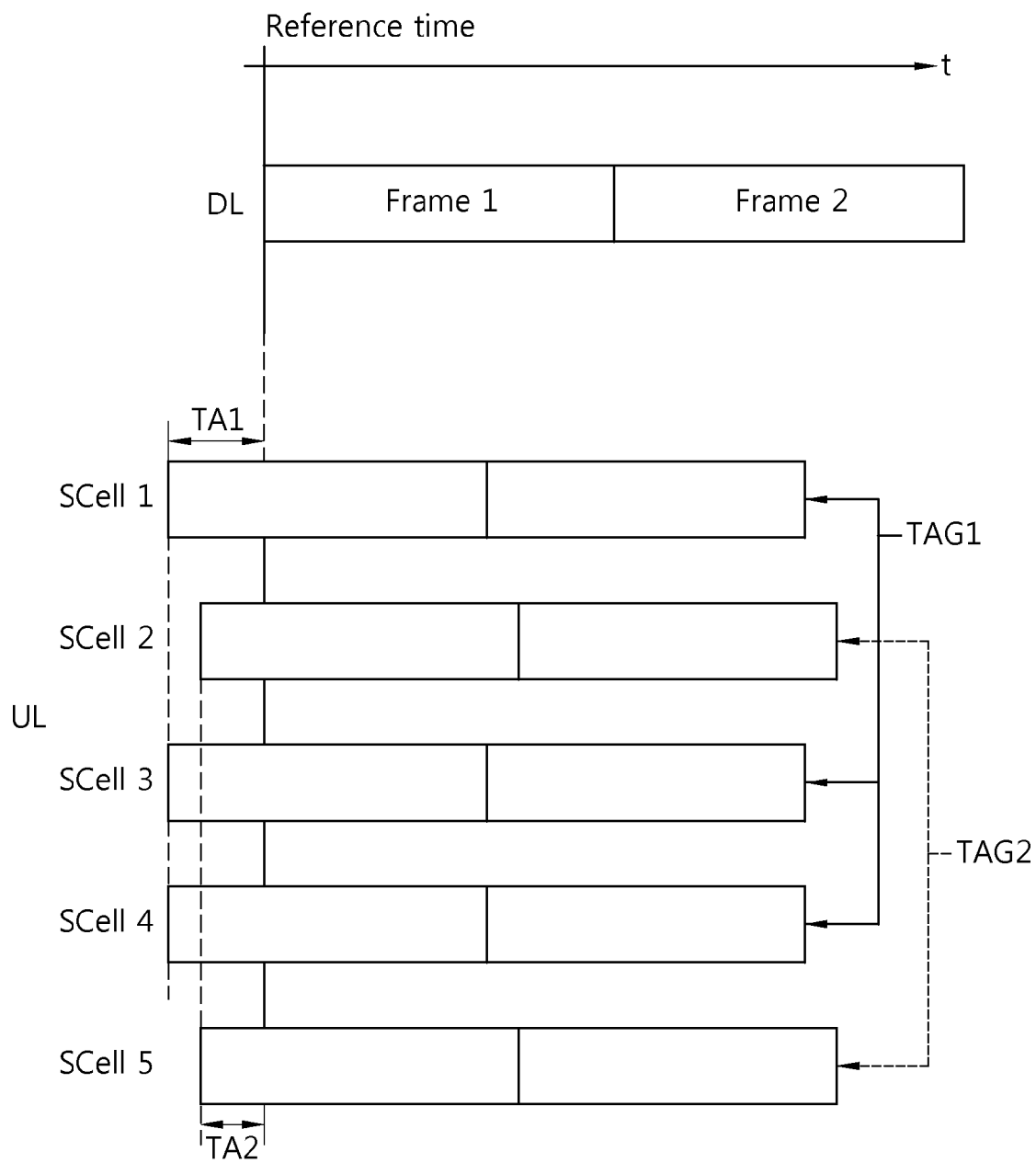
FIG. 25 is an explanatory diagram illustrating a method of performing uplink synchronization by using a TAV in a multiple CC system.

FIG. 25 is an explanatory diagram illustrating a method of performing uplink synchronization by using a TAV in a multiple CC system.

Referring to FIG. 25, reference time means time which is a criterion for the synchronization of downlink or uplink. A serving cell which provides the reference time may be called a timing reference cell. It is assumed that the reference time has been set to a point of time at which a downlink frame is received by a UE, synchronized, and then checked. A serving cell1 (SCell 1), a serving cell2 (SCell 2), a serving cell3 (SCell 3), a serving cell4 (SCell 4), and a serving cell5 (SCell 5) are configured in the UE. For example, SCell1 can be configured as a PSC.

A BS configures the serving cell1, the serving cell3, and the serving cell4 as one TAG1 and configures the serving cell2 and the serving cell5 as another TAG2. So the BS can configure the TAG1 including the PSC as a pTAG. The current uplink timing of serving cells of the pTAG is later than the reference time by TA1. Thus, the BS sets a first TAV so that the uplink timing of the serving cells of the pTAG advances the present time by the TA1, indicates the first TAV in a first TAC field. The BS sets a first TAG index field to 00 to indicate the pTAG, and transmits the first TAC field and the first TAG index field to the UE.

Furthermore, the uplink timing of serving cells of the TAG2 (that is a sTAG) is later than the present time by TA2. Thus, the BS sets a second TAV so that the uplink timing of the serving cells of the TAG2 advances the present time by the TA2, indicates the second TAV in a second TAC field. The BS sets a second TAG index field to 01 to indicate the sTAG, and transmits the second TAC field and the second TAG index field to the UE.

A MAC CE including the first TAC field and the first TAG index field or a MAC CE including the second TAC field and the second TAG index field may have any one of the structures shown in FIGS. 18 to 22.

The UE may calculate the TA1 and the TA2 by using the first and the second TAVs provided by the BS and adjust the uplink timing based on the calculated TA1 and TA2. The adjusted uplink timing alignment (TA) may be calculated according to Equation 1 below.

$$TA = (N_{TA} + N_{TA\ offset}) \times T_s \qquad \text{[Equation 1]}$$

In Equation 1, $N_{TA}$ is a timing offset between a UL radio frame and a downlink radio frame in a UE and is indicated by a $T_s$ unit. $N_{TA}$ is variably controlled by the TAC of the BS, and $N_{TA}$ offset is a value fixed by a frame format. $T_s$ is a sampling period.

Meanwhile, an old timing offset $N_{TA\text{-}old}$ is adjusted to a new timing offset $N_{TA\text{-}new}$ by a TAV $T_i$, and $N_{TA\text{-}new}$ may be calculated according to Equation 2 below.

$$N_{TA\text{-}new} = N_{TA\text{-}old} (T_i - 31) \times 16 \qquad \text{[Equation 2]}$$

Referring to Equation 2, $T_i$ is an index value and is 0, 1, 2, ..., 63. That is, $T_i$ may be represented by 6 bits. $T_i$ is indicated by a TAC field. Here, if $N_{TA}$ is positive (+), it means that uplink timing is advanced. If $N_{TA}$ is negative (−), it means that uplink timing is delayed. That is, the TAC field indicates a TAV which is a relative change of uplink timing to old uplink timing.

Alternatively, the TAV may also be used to determine the timing offset $N_{TA}$ of a TAG including an SSC to a change of the uplink timing of a TAG including a PSC, as in Equation 3.

$$N_{TA\text{-}TAG(Sn)} = N_{TA\text{-}TAG(p)} + (T_{i\text{-}n} - 31) \times 16 \qquad \text{[Equation 3]}$$

Referring to Equation 3, $N_{TA\text{-}TAG(Sn)}$ is a timing offset for a TAG which does not include a PSC (PCell) and has an index value of n. $N_{TA\text{-}TAG(p)}$ is a timing offset for a TAG including a PSC (PCell). $T_{i\text{-}n}$ is a TAV $T_i$ for a TAG having an index value of n.

If a UE receives a TAV for a serving cell for the first time, the calculation of the timing offset NTA may be defined as in Equation 4 because there is no value to be compared with the TAV.

$$N_{TA\text{-}TAG(Sn)} = (T_{i\text{-}n} - 31) \times 16 \qquad \text{[Equation 4]}$$

For another example, if the propagation delay time of downlink transmission is identical with the propagation delay time of uplink transmission, a UE may adjust uplink timing for all serving cells by using the propagation delay time of the downlink transmission.

Figure 26:
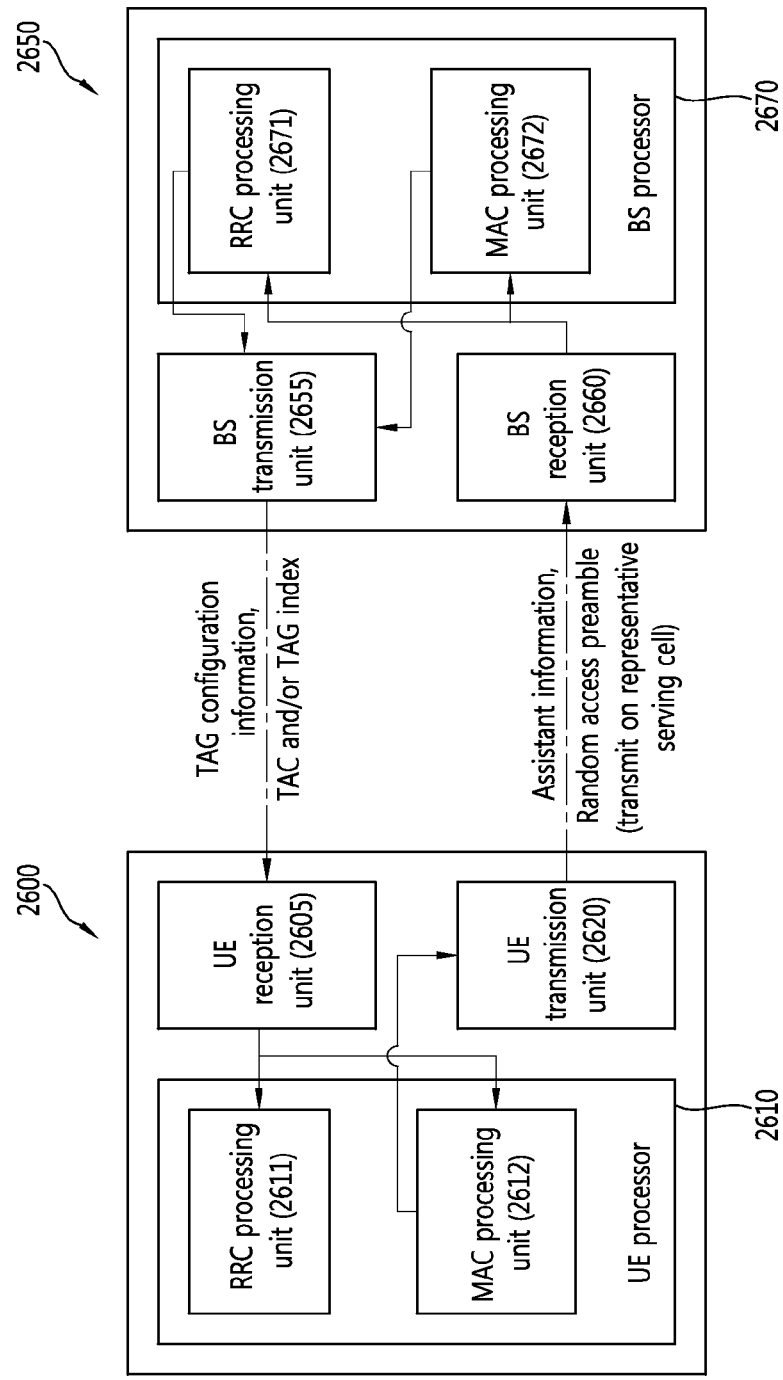
FIG. 26 is a block diagram showing an apparatus which perform uplink synchronization according to an example of the present invention.

FIG. 26 is a block diagram showing a BS and a UE which perform uplink synchronization according to an example of the present invention.

Referring to FIG. 26, the UE 2600 includes a UE reception unit 2605, a UE processor 2610, and a UE transmission unit 2620. The UE processor 2610 includes an RRC processing unit 2611 and an MAC processing unit 2612.

The UE reception unit 2605 receives an MAC PDU, preamble allocation information regarding a PDCCH order, TAG configuration information, and a MAC CE for a TAC, an RRC connection message, an RRC connection reconfiguration message, or a contention resolution message from the BS 2650.

The RRC processing unit 2611 configures and generates assistant information, an RRC connection message, and an RRC connection reconfiguration completion message. Here, the assistant information provides information or a criterion on classifying at least one serving cell configured in the UE 2600 into a TAG. The assistant information may be included in an RRC connection reconfiguration completion message or another message. A representative serving cell is a serving cell including a timing reference DL CC, that is, a criterion in order to apply a TAV subsequently received through a random access response. The TAG configuration information describes the state in which TAGs are configured in the UE 2600.

The RRC processing unit 2611 analyzes the TAG configuration information received from the BS 2650, and identifies at least one of the number of TAGs configured in the UE 2600, an index of each TAG, indices of serving cells included in each TAG and representative serving cell information. Or, the TAG configuration information may be analyzed by the MAC processing unit 2612 if the TAG configuration information is transmitted as shown in FIGS. 9 to 11.

The MAC processing unit 2612 performs operations for uplink timing alignment. To acquire uplink timing synchronization, the MAC processing unit 2612 may receive or identify a MAC RAR according to a random access procedure or may receive or identify a MAC layer signaling. Here, the MAC layer signaling may include a MAC PDU including a MAC CE for a TAC.

In an embodiment, the MAC processing unit 2612 may process a non-contention-based or contention-based random access procedure. The MAC processing unit 2612 generates a random access preamble to acquire uplink timing synchronization for a serving cell. The generated random access preamble may be a dedicated random access preamble assigned by the BS 2650. If multiple TAGs are configured in the UE 2600, the MAC processing unit 2612 may generate multiple random access preambles to be transmitted on the representative serving cell of each TAG.

The MAC processing unit 2612 may obtain a TAC from the random access response message in a MAC RAR format, and may obtain TAG index information for which uplink timing alignment is performed.

In another embodiment, the MAC processing unit 2612 identifies and analyzes the MAC PDU received by the UE reception unit 2605. For example, the MAC processing unit 2612 obtains a header, a MAC CE and a MAC SDU, etc from the MAC PDU. The MAC processing unit 2612 obtains, from the MAC header, a subheader. The MAC processing unit 2612 obtains, from the subheader, a LCID field corresponding to the MAC CE. The MAC processing unit 2612 obtains the TAC field with 6 bits and the TAG index field with 2 bits.

More details, the MAC processing unit 2612 identifies the type of the MAC CE by analyzing an index indicated by the LCID field. Based on the index indicated by the LCID field, the MAC processing unit 2612 identifies that the MAC CE is for a TAC. For instance, the MAC processing unit 2612 checks if the index of the LCID field is set to 11101. If the index of the LCID field is set to 11101, the MAC processing unit 2612 confirms that the MAC CE includes a TAC field for uplink timing alignment and a TAG index field to which a TAV indicated by the TAC field is applied. In other words, the MAC processing unit 2612 checks (or determines) a corresponding MAC CE for the TAC, such as that shown in FIGS. 18 to 20, in the MAC PDU, based on the index of the LCID field included in the subheader.

The MAC processing unit 2612 identifies a TAG based on the TAG index fields ($G_1$, $G_0$) and identifies the TAV based on the TAC field. Here, the TAG includes at least one serving cell to identically control uplink timing adjustment according to the TAV. And the maximum number of TAGs may be limited to 4. Then, the MAC processing unit 2612 determines to perform uplink timing alignment for a pTAG or a sTAG through the TAG index fields ($G_1$, $G_0$). For example, if the TAG index fields ($G_1$, $G_0$) are set to 00, then the MAC processing unit 2612 performs uplink timing alignment for the pTAG. And the MAC processing unit 2612 can identify 4 TAGs defined by 2 bits of the TAG index fields ($G_1$, $G_0$). And the MAC processing unit 2612 adjusts uplink timing with regards to indication of a TAC field included in the MAC CE.

The MAC processing unit 2612 performs uplink timing alignment by checking a TAC field and a TAG index field within the MAC CE, and adjusts uplink timing regarding at least one serving cell within the checked TAG according to a TAV indicated by the TAC.

An example in which the MAC processing unit 2612 adjusts the uplink timing based on the TAV is shown in any one of Equation 1 to Equation 4. If TAC fields and TAG indices for a plurality of TAGs exist in the MAC PDU, the MAC processing unit 2612 adjusts uplink timing regarding serving cells for each TAG according to a TAV indicated by a relevant TAC.

The UE transmission unit 2620 transmits assistant information, an RRC connection message, an RRC connection reconfiguration completion message, or a random access preamble to the BS 2650. For example, it is assumed that TAGs configured in the UE are a TAG1 and a TAG2, TAG1={a first serving cell, a second serving cell, a third serving cell}, and TAG2={a fourth serving cell, a fifth serving cell}. If a representative serving cell within the TAG1 is the second serving cell and a representative serving cell within the TAG2 is the fifth serving cell, the UE transmission unit 2620 transmits a first random access preamble on the second serving cell and transmits a second random access preamble on the fifth serving cell. Furthermore, the UE transmission unit 2620 may transmit an uplink signal based on uplink timing adjusted by the MAC processing unit 2612.

The BS 2650 includes a BS transmission unit 2655, a BS reception unit 2660, and a BS processor 2670. The BS processor 2670 includes an RRC processing unit 2671 and an MAC processing unit 2672.

The BS transmission unit 2655 transmits preamble allocation information, TAG configuration information, a random access response message, a MAC PDU including a MAC CE for a TAC, an RRC connection completion message, an RRC connection reconfiguration message, or a contention resolution message to the UE 2600. The random access response message is transmitted through a PDSCH indicated by a PDCCH scrambled with a C-RNTI. Here, the C-RNTI is an identifier allocated to the UE 2600 by the BS 2650 in order for the UE 2600 to check RRC connection set up with the BS 2650 and scheduling information transmitted by the BS 2650. The BS 2650 has to allocate a different C-RNTI value to each user within the BS 2650. A temporary C-RNTI is allocated through a random access response during a contention-based random access procedure which is performed by the UE 2600 for RRC connection. When the relevant random access procedure is finally successful, the UE 2600 recognizes the temporary C-RNTI as a C-RNTI. The PDCCH indicating the random access response message may be transmitted through a representative serving cell itself or a scheduling cell for a representative serving cell.

The MAC CE for a TAC may be transmitted, including a TAC field with 6 bits or 11 bits and TAG ID information. The PDCCH indicating the random access response message and the random access response message may be received through another serving cell not an SSC which includes a UL CC on which a random access preamble has been transmitted. That is, when the random access response is transmitted, the PDCCH indicating the random access response message and the random access response message may be transmitted without being limited to scheduling for a specific serving cell.

The BS reception unit 2660 receives assistant information, a random access preamble, a message related to RRC connection, or a message related to an RRC connection reconfiguration from the UE 2600.

The RRC processing unit 2671 configures and generates an RRC connection completion message or an RRC connection reconfiguration message. Furthermore, the RRC processing unit 2671 generates a TAG and generates TAG configuration information.

The TAG is a group including at least one serving cell configured in the UE 2600, and the same TAV is applied to serving cells within a TAG. For example, the RRC processing unit 2671 may configure the TAG specifically to the UE 2670. For another example, the RRC processing unit 2671 may configure the TAG in a cell-specific manner.

The MAC processing unit 2672 selects one of dedicated random access preambles which have been reserved for a non-contention-based random access procedure, from among all available random access preambles and generates preamble allocation information including the index of the selected random access preamble and information about available time/frequency resources.

In an embodiment, the MAC processing unit 2672 generates a random access response message or a contention resolution message. The MAC processing unit 2672 checks a representative serving cell on which a random access preamble has been transmitted and checks a TAG including the representative serving cell. And the MAC processing unit 2672 may generate TAG configuration information as described in any one of FIGS. 9 to 11.

In another embodiment, the MAC processing unit 2672 determines a TAV that is to be applied to (or relevant to) the TAG and generates a TAC field with 6 bits indicating the determined TAV. The TAC indicates a relative change of uplink timing for the present uplink timing, and it may be a multiple of an integer of a sampling time $T_s$, for example, 16 $T_s$. The TAC may be represented by a TAV having a specific index. The MAC processing unit 2672 generates the MAC CE for a TAC including the generated TAC field and the corresponding TAG index field.

In more detail, the MAC processing unit 2672 generates (sets or configures) a LCID field with a specific index such as 11101 to indicate the corresponding MAC CE is for a TAC, and generates a header having a subheader by including the LCID field in the subheader. The MAC processing unit 2672 also generates the MAC CE for a TAC by including a TAC field and a TAG index field ($G_1$, $G_0$) in the MAC CE. The MAC processing unit 2672 can identify 4 TAGs defined by 2 bits of the TAG index fields ($G_1$, $G_0$). Furthermore, the MAC processing unit 2672 generates the TAG fields ($G_1$, $G_0$) to '00' or '0' to indicate a PSC may be included.

And the MAC processing unit 2672 generates a MAC PDU by including the generated MAC CE and the generated header in the MAC PDU. The MAC processing unit 2672 generates and sets the TAG index field ($G_1$, $G_0$) to a specific value to identify that the TAG is a pTAG or a sTAG. The structure of the MAC PDU is shown in FIG. 17, and the structure of the MAC CE for the TAC may be any one of FIGS. 18 to 20.

In accordance with this specification, a procedure of obtaining a TAV for a serving cell in order to secure and maintain uplink timing synchronization becomes clear, the time taken to obtain uplink synchronization for a serving cell may be reduced, and overhead may be reduced by obtaining a TAV for a plurality of serving cells.

While some exemplary embodiments of the present invention have been described with reference to the accompanying drawings, those skilled in the art may change and modify the present invention in various ways without departing from the essential characteristic of the present invention. Accordingly, the disclosed embodiments should not be construed to limit the technical spirit of the present invention, but should be construed to illustrate the technical spirit of the present invention. The scope of the technical spirit of the present invention is not limited by the embodiments, and the scope of the present invention should be interpreted based on the following appended claims. Accordingly, the present invention should be construed to cover all modifications or variations induced from the meaning and scope of the appended claims and their equivalents.

What is claimed is:

1. A method of performing an uplink synchronization by a base station (BS) in a wireless communication system, the method comprising:

transmitting configuration information to a user equipment (UE), the configuration information including timing advanced group (TAG) information indicating serving cells in which a timing advanced value (TAV) is applied;

transmitting random access preamble (RAP) allocation information to the UE, the RAP allocation information including a RAP index that indicates one preamble sequence selected from at least one dedicated RAP for a non-contention based random access procedure;

receiving a message including the preamble sequence; and transmitting a random access response (RAR) to the UE, the RAR including a medium access control (MAC) protocol data unit (PDU), wherein the MAC PDU comprises a header and a MAC control element (CE), wherein the header includes a logical channel identifier (LCID) that indicates whether the MAC CE includes a timing advanced command (TAC) field, and wherein the MAC CE includes a TAC field indicating a TAV and a TAG index field identifying a TAG to control uplink timing adjustment identically with the TAV, the TAC field being a 6-bit value, and the TAG index field being a 2-bit value.

2. The method of claim 1, wherein the message is received through a first serving cell, and the first serving cell is an activated serving cell among the serving cells in the TAG.

3. The method of claim 1, further comprising transmitting a Physical Downlink Control Channel (PDCCH) order to initiate a random access procedure for a secondary serving cell.

4. The method of claim 1, wherein the at least one dedicated RAP is dedicated to the UE for the non-contention based random access procedure.

5. A method of performing an uplink synchronization by a User Equipment (UE) in a wireless communication system, the method comprising:

receiving configuration information, the configuration information including timing advanced group (TAG) information indicating serving cells in which a timing advanced value (TAV) is applied;

receiving random access preamble (RAP) allocation information, the RAP allocation information including a RAP index that indicates one preamble sequence selected from at least one dedicated RAP for a non-contention based random access procedure;

transmitting a message including the preamble sequence to a base station (BS); and receiving a random access response (RAR), the RAR including a medium access control (MAC) protocol data unit (PDU), wherein the MAC PDU comprises a header and a MAC control element (CE), wherein the header includes a logical channel identifier (LCID) that indicates whether the MAC CE includes a timing advanced command (TAC) field, and wherein the MAC CE includes a TAC field indicating a TAV and a TAG index field identifying a TAG to control uplink timing adjustment identically with the TAV, the TAC field being a 6-bit value, and the TAG index field being a 2-bit value.

6. The method of claim 5, wherein the message is transmitted through a first serving cell, and the first serving cell is an activated serving cell among the serving cells in the TAG.

7. The method of claim 5, further comprising receiving a Physical Downlink Control Channel (PDCCH) order to initiate a random access procedure for a secondary serving cell.

8. The method of claim 5, wherein the at least one dedicated RAP is dedicated to the UE for the non-contention based random access procedure.

* * * * *